US011084071B2

(12) United States Patent
Heinrichs

(10) Patent No.: US 11,084,071 B2
(45) Date of Patent: Aug. 10, 2021

(54) SUCTION DEVICE FOR WASTEWATER TANK AND DISPOSAL STATION FOR A VEHICLE

(71) Applicant: VOGELSANG GMBH & CO. KG, Essen (DE)

(72) Inventor: Martin Heinrichs, Essen (DE)

(73) Assignee: VOGELSANG GMBH & CO KG, Essen (DE)

( * ) Notice: Subject to any disclaimer, the term of this patent is extended or adjusted under 35 U.S.C. 154(b) by 153 days.

(21) Appl. No.: 15/903,210

(22) Filed: Feb. 23, 2018

(65) Prior Publication Data
US 2020/0070220 A1    Mar. 5, 2020

(30) Foreign Application Priority Data

Feb. 24, 2017 (DE) .......................... 202017101065.1
Oct. 12, 2017 (DE) .......................... 202017106203.1

(51) Int. Cl.
B08B 9/08      (2006.01)
B60R 15/04     (2006.01)
B60S 5/00      (2006.01)

(52) U.S. Cl.
CPC ................ B08B 9/08 (2013.01); B60R 15/04 (2013.01); B60S 5/00 (2013.01); B60Y 2200/143 (2013.01); B60Y 2200/30 (2013.01)

(58) Field of Classification Search
None
See application file for complete search history.

(56) References Cited

U.S. PATENT DOCUMENTS

| 3,528,462 | A | 9/1970 | Quase |
| 7,523,512 | B1 | 4/2009 | Delaney |
| 2002/0174886 | A1 | 11/2002 | Paper |
| 2004/0094227 | A1* | 5/2004 | Few ...................... F01M 11/04 141/98 |
| 2009/0101219 | A1* | 4/2009 | Martini ............... A61M 1/0001 137/565.29 |

(Continued)

FOREIGN PATENT DOCUMENTS

| DE | 8900672 | 6/1989 |
| DE | 19844354 | 6/1999 |

(Continued)

Primary Examiner — Richard C Gurtowski
(74) Attorney, Agent, or Firm — Price Heneveld LLP

(57) ABSTRACT

The invention relates to a suction unit for a wastewater tank, comprising a suction channel extending from a suction adapter designed for attachment to a suction port in the wastewater tank, a connection coupling extending from the suction adapter, wherein said connection coupling and said suction channel are arranged so that the suction channel extends into the wastewater tank, a suction pump connected fluid-tightly to the connection coupling, and a pump control unit in signal communication with the suction pump. A flushing channel extends from a flush adapter designed for attachment to a flushing hole in the wastewater tank, the pump control unit being configured to extract wastewater from the wastewater tank through the suction channel, the connecting line and the suction pump by means of the suction pump, and wastewater is flushed from the wastewater tank through the flushing channel.

46 Claims, 20 Drawing Sheets

(56) References Cited

U.S. PATENT DOCUMENTS

2015/0225936 A1* 8/2015 Mehta ................... E03D 11/00
4/321

FOREIGN PATENT DOCUMENTS

| | | |
|---|---|---|
| DE | 202007001826 | 6/2008 |
| DE | 102009051351 | 5/2011 |
| DE | 102010032852 | 2/2012 |
| DE | 202011002009 | 4/2012 |
| DE | 202012003064 | 7/2012 |
| DE | 102013003070 | 8/2014 |
| DE | 202015034420 | 6/2015 |
| DE | 202014003274 | 7/2015 |
| DE | 102014206514 | 10/2015 |
| DE | 102015106371 | 10/2015 |
| DE | 202015103442 | 10/2016 |
| DE | 202016103149 | 1/2017 |
| DE | 102015113950 | 2/2017 |
| DE | 202016102246 | 7/2017 |
| DE | 202016105218 | 12/2017 |
| DE | 202016106367 | 3/2018 |
| DE | 202017101065 | 5/2018 |
| EP | 2850928 | 3/2015 |
| EP | 3133219 | 2/2017 |
| EP | 3375943 | 9/2018 |
| HK | 1215421 | 8/2016 |
| WO | 2012012867 | 2/2012 |
| WO | 2012163863 | 12/2012 |
| WO | 2017186858 | 11/2017 |

* cited by examiner

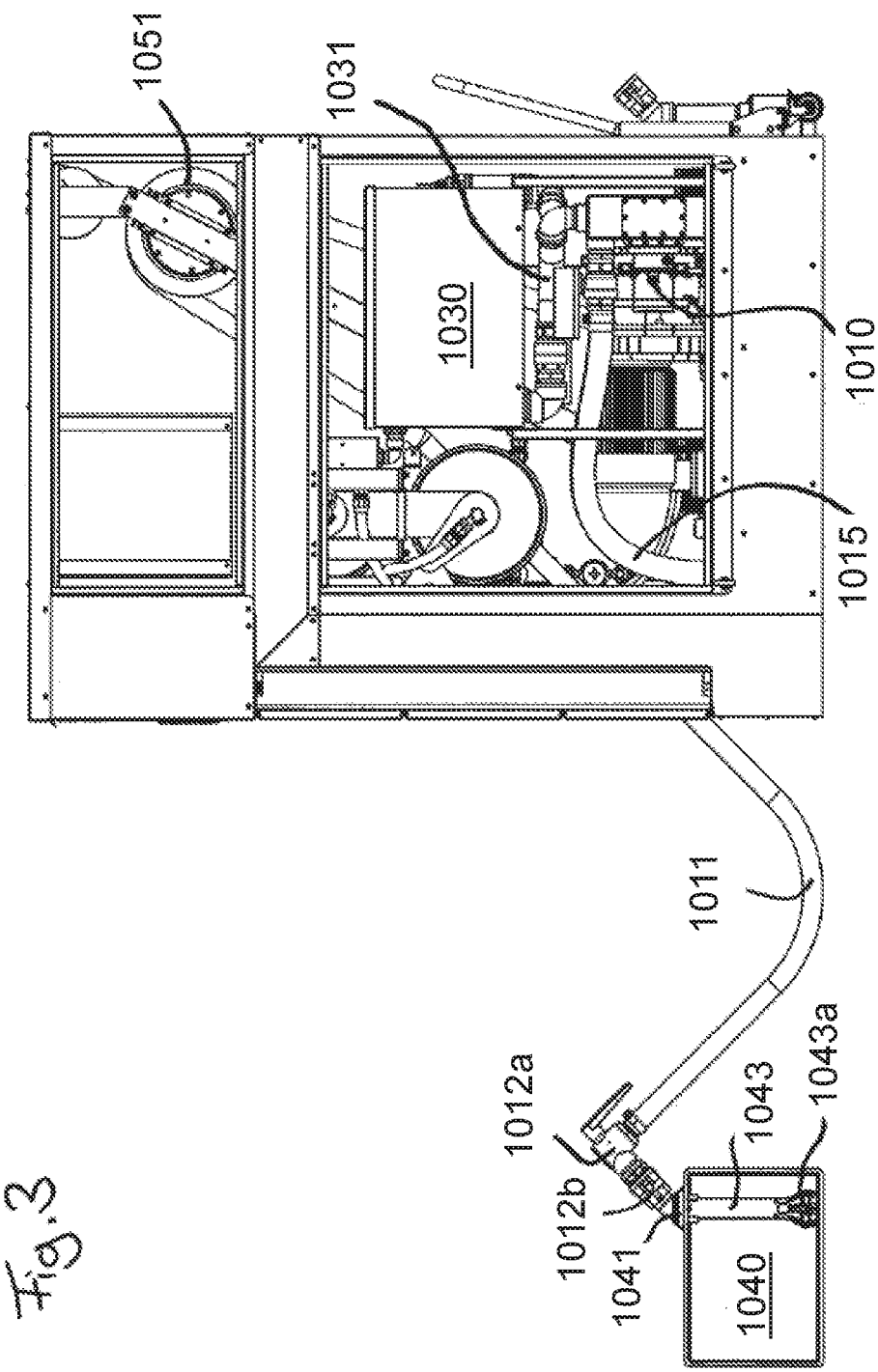

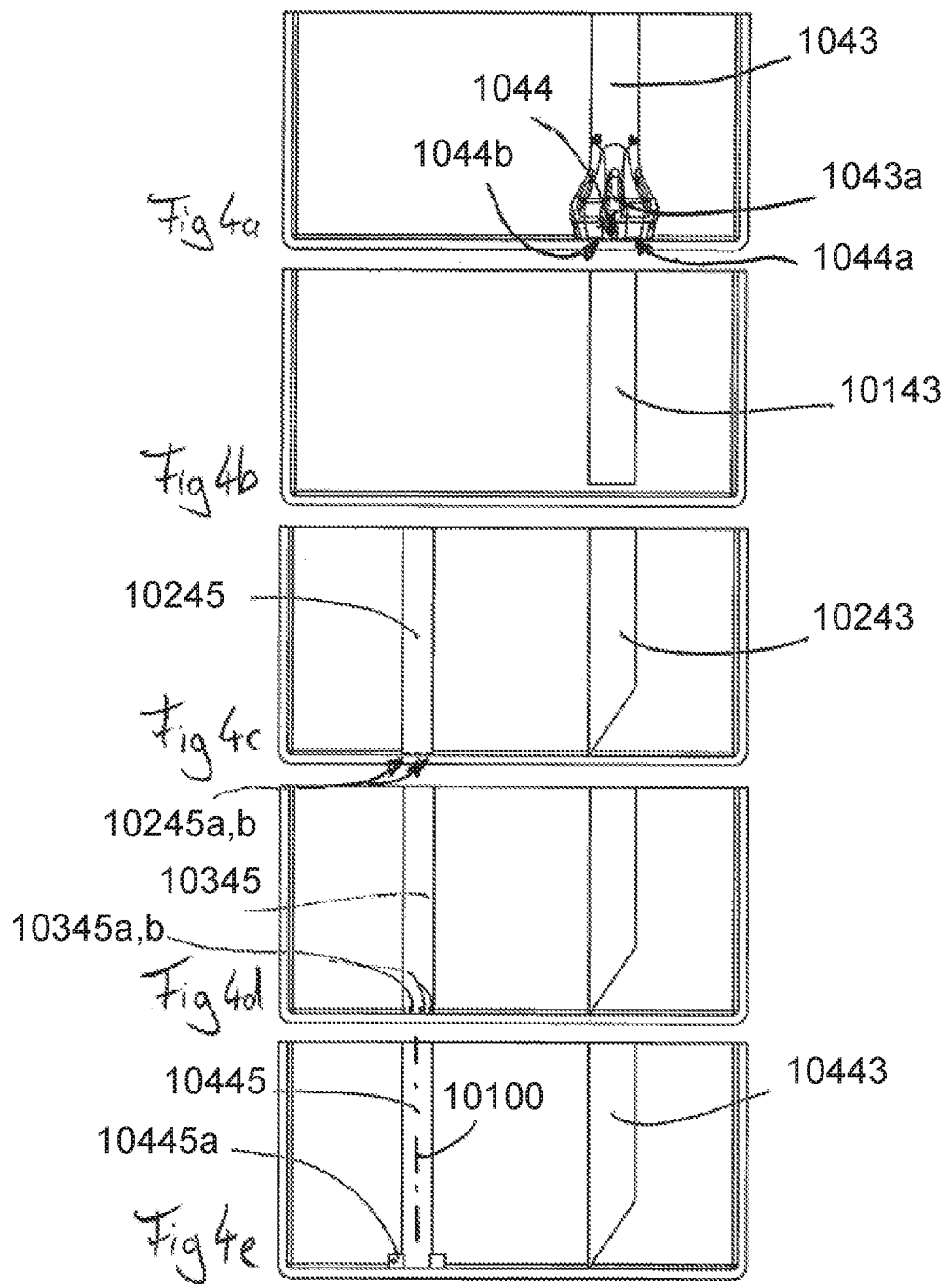

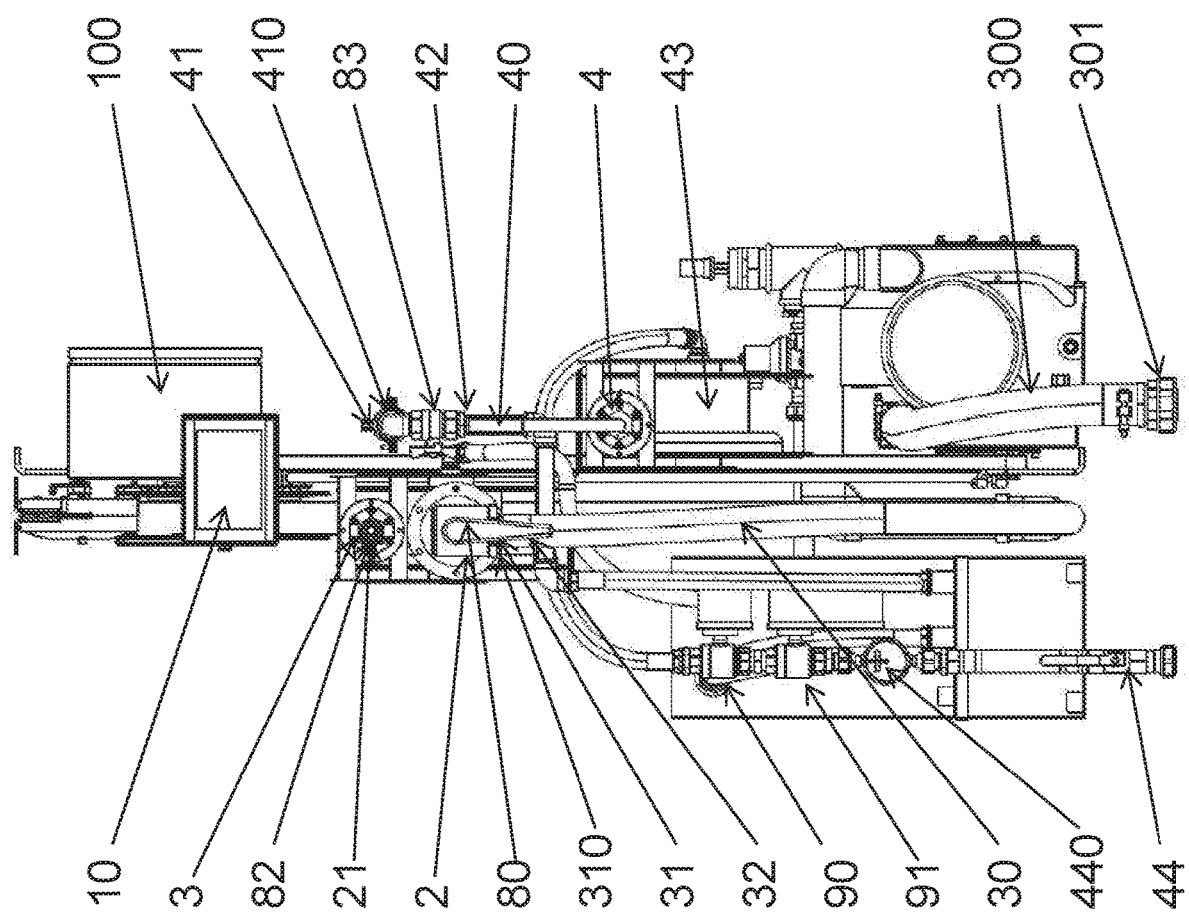

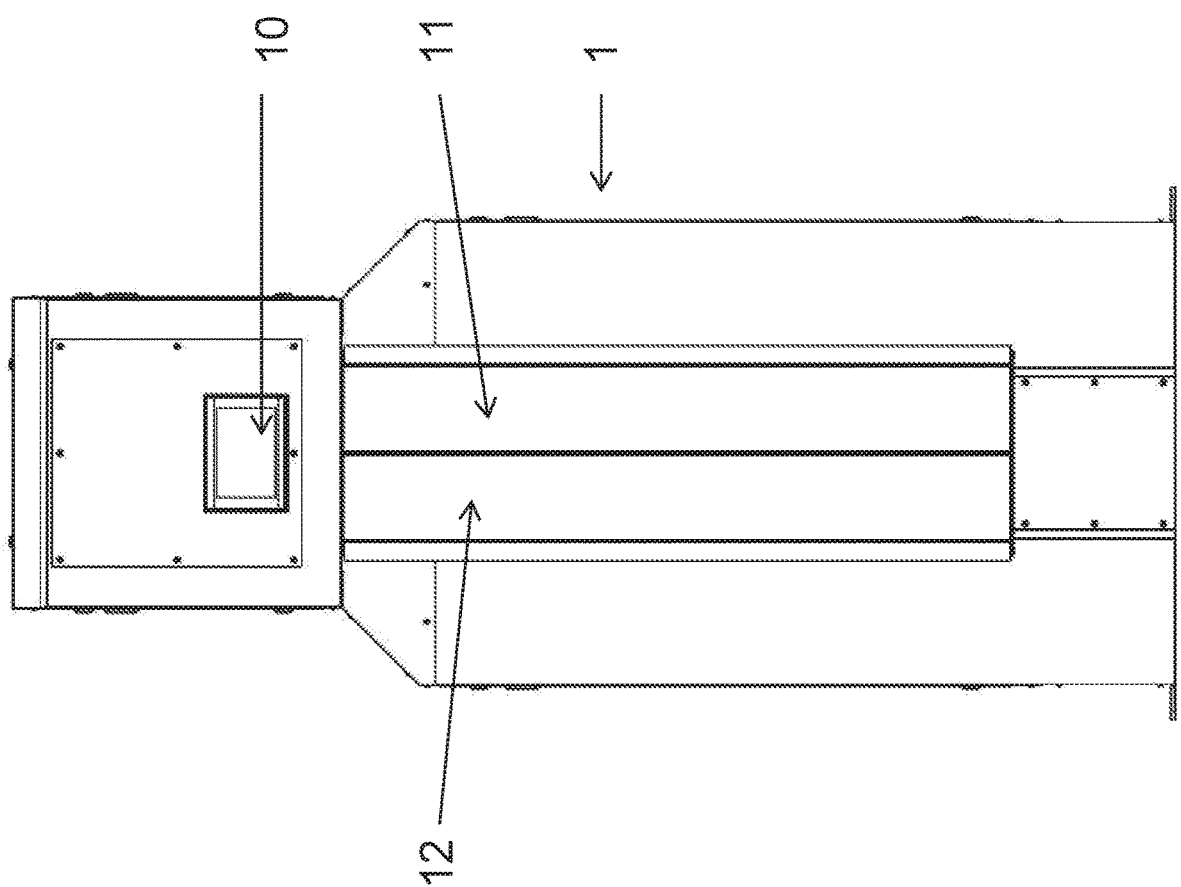

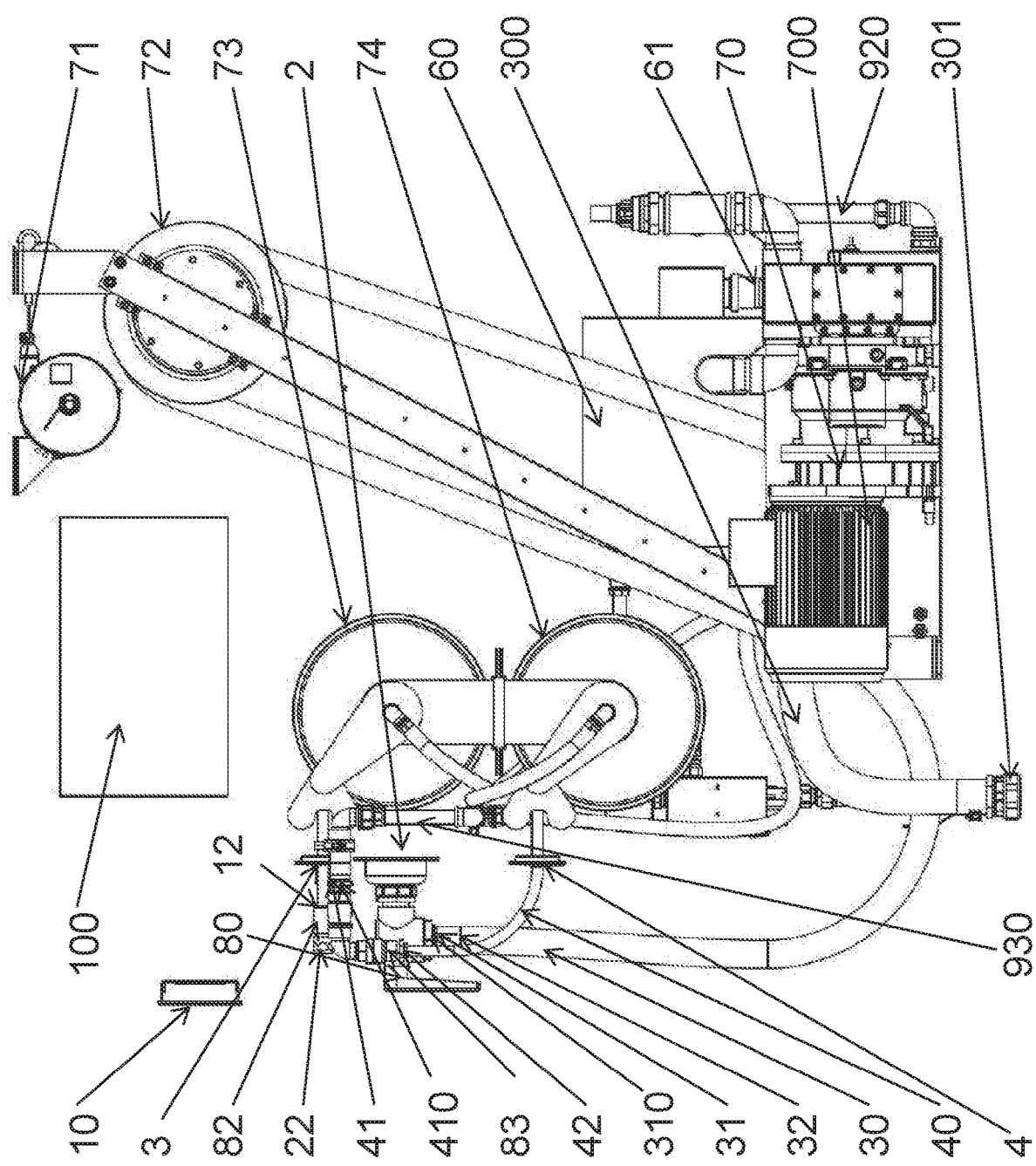

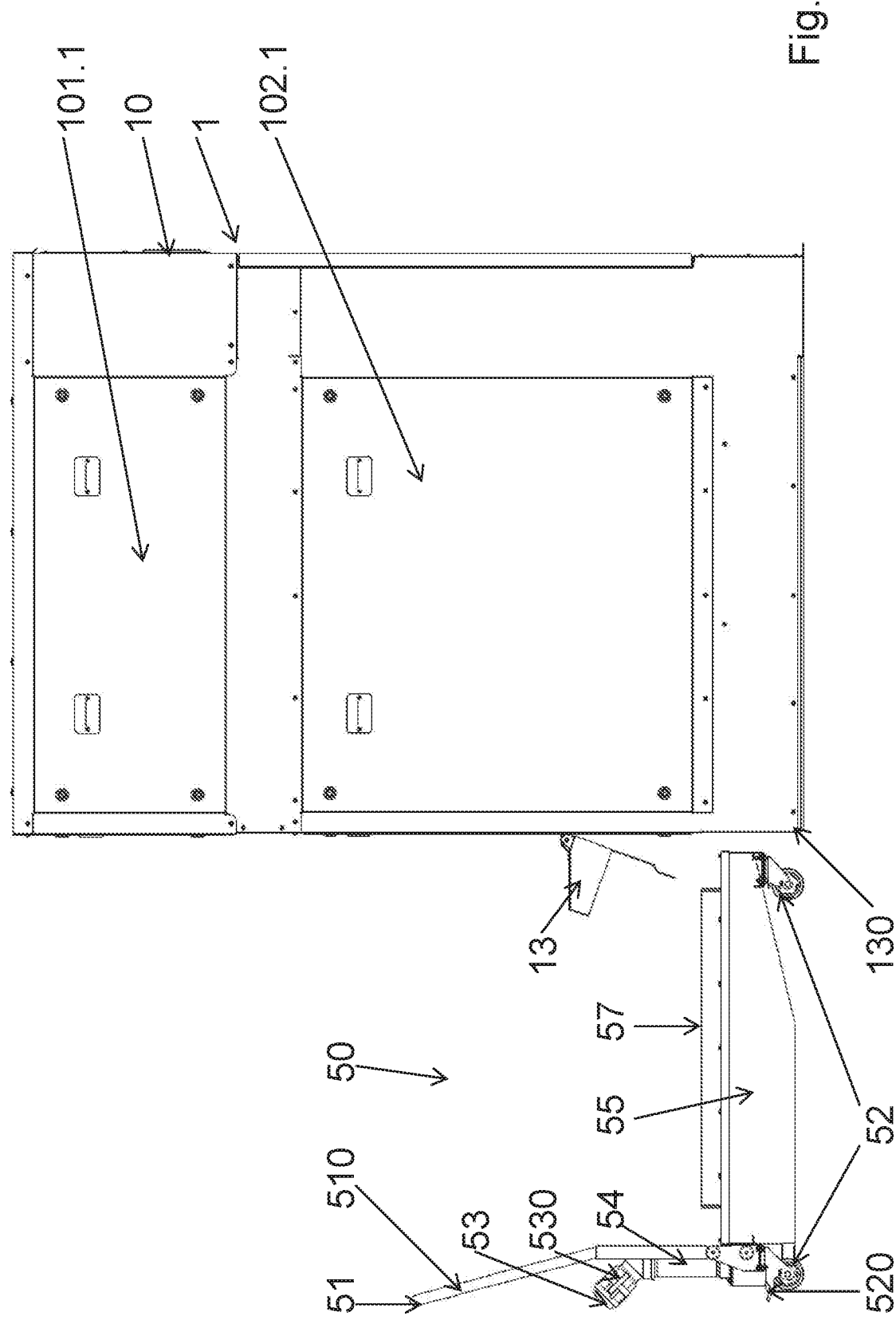

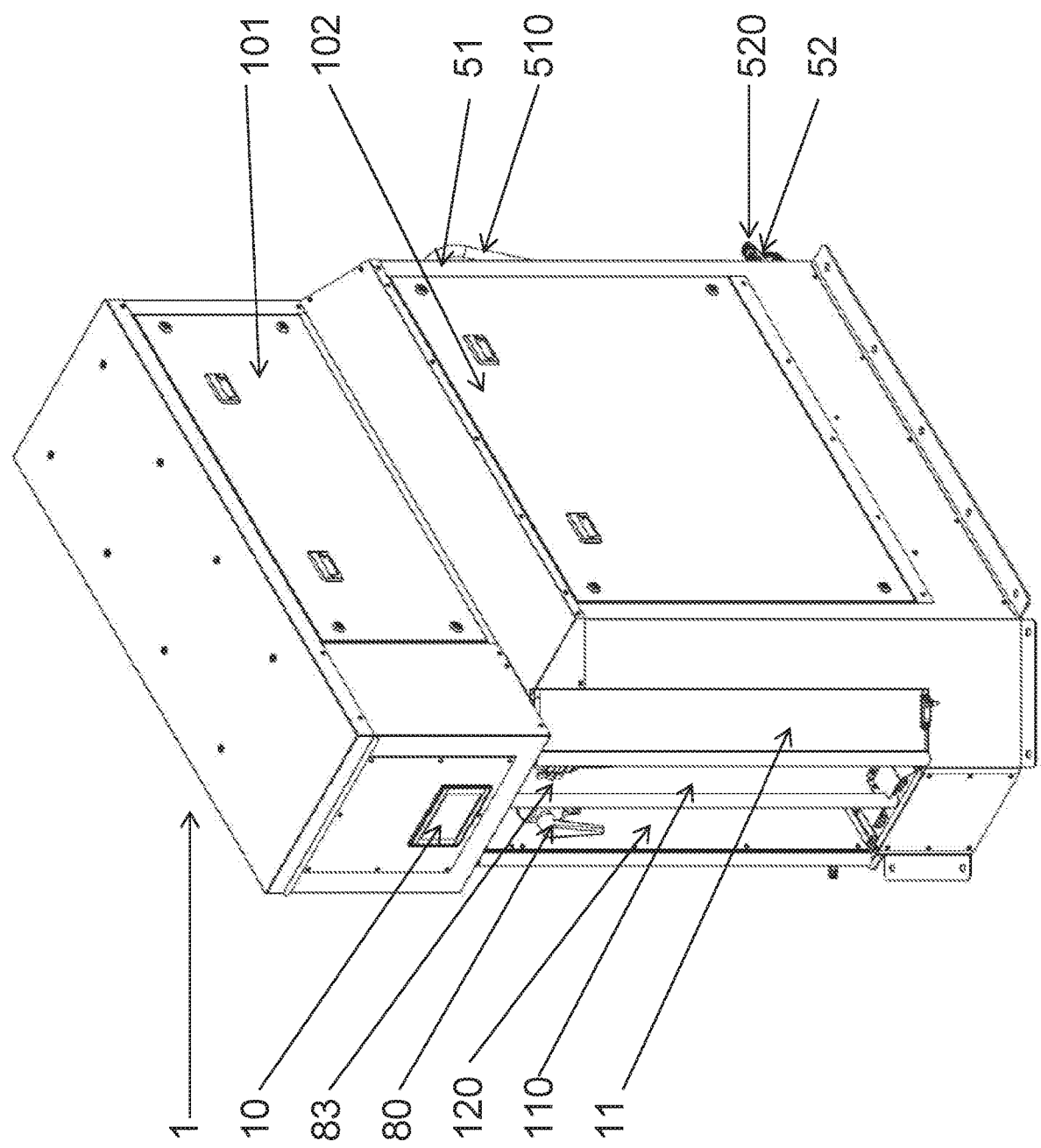

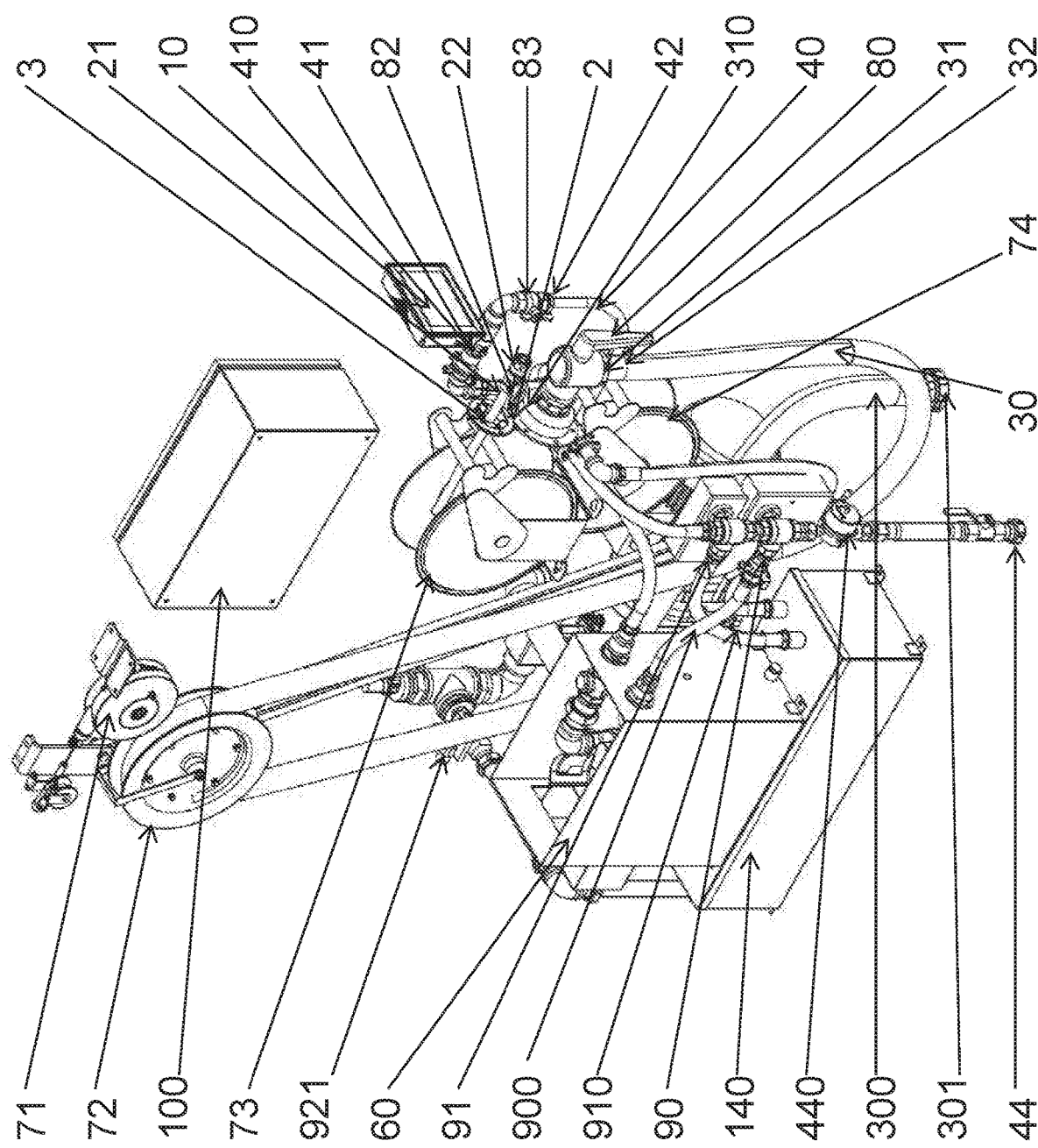

SUCTION DEVICE FOR WASTEWATER TANK AND DISPOSAL STATION FOR A VEHICLE

CROSS-REFERENCE TO FOREIGN PRIORITY APPLICATION

The present application claims the benefit under 35 U.S.C. §§ 119(b), 119(e), 120, or 365(c) of DE 202017101065.1 filed Feb. 24, 2017, and DE 202017106203.1 filed Oct. 12, 2017.

FIELD OF THE INVENTION

The invention relates to a suction unit for wastewater tanks, comprising a suction channel extending from a suction adapter designed for attachment in the region of an opening in the wastewater tank to a suction port, a connection coupling extending from the suction adapter, wherein said connection coupling and said suction channel are arranged in such a way in relation to the adapter that when the adapter is installed in the region of the opening in the wastewater tank, the suction channel extends into the wastewater tank and the connection coupling is arranged outside the wastewater tank, a suction pump with a connecting line, which can be connected fluid-tightly to the connection coupling, and a pump control unit which is in signal communication with the suction pump in order to control it. Another aspect of the invention concerns a method for extracting wastewater from wastewater tanks.

BACKGROUND OF THE INVENTION

In the sanitation field especially, emptying wastewater tanks is a recurrent task which must be carried out, for example, in the case of wastewater tanks that are installed in vehicles. In the latter case, wastewater from a sanitary area installed on board such a vehicle is collected in a wastewater tank which is typically installed underneath the sanitary area and must be removed from said wastewater tank at regular intervals. A typical example of such wastewater tanks are the wastewater tanks onboard overland buses or rail vehicles.

Wastewater tanks can also be understood as stationary or mobile collecting trays, which can be in-ground or pushed under a vehicle, for example, so as to receive wastewater from a wastewater tank of the vehicle.

As a basic principle, emptying the wastewater from such a wastewater tank by opening a seal disposed in the base wall of the wastewater tank or at a low-lying point of the wastewater tank is known. For example, an opening in the base can be opened and closed by means of a slide valve, or a screw cap or bayonet cap may be provided for emptying the wastewater. This approach generally results in complete removal of the wastewater, but it has the disadvantage that operating the discharge valve in the base often dirties the operator or the surroundings, because accessibility is frequently unfavorable, the wastewater surges out of the wastewater tank, and the opening is frequently positioned with insufficient precision above a collecting tray or channel.

To avoid these disadvantages, and instead of emptying the wastewater through an opening in the base, it is known from DE 20 2016 106367 U1 to equip the wastewater tank with a suction channel which extends from the top side downward into the tank and ends just above the floor of the wastewater tank, where the suction channel has a respective suction port. Such a suction technique using a suction channel allows the wastewater to be removed from the wastewater tank with much less tendency to soil the surroundings, while also allowing hygienic operation. However, particularly whenever wastewater containing solid matter is to be removed from wastewater tanks by means of such a suction technique, it has been found that such solids cannot be removed completely from the wastewater tank by suction. When they occur more frequently, such solids can cause blockages in the suction channel, thus preventing extraction. Furthermore, any such solids remaining in the wastewater tank after the extraction process will reduce the uptake capacity of the wastewater tank, thus increasing the frequency with which extraction must be carried out. Solids remaining in the wastewater tank can also cause odor nuisance in the surrounding area.

The object of the invention is to provide a system for removing wastewater from a wastewater tank, in which it is possible to remove wastewater containing solids from a wastewater tank both hygienically and completely.

This object is achieved, according to the invention, with a suction unit of the kind initially described, which is further developed by a flushing channel which extends from a flush adapter designed for attachment in the region of an opening in the wastewater tank to a flushing hole, the pump control unit being configured to control an extraction process such that wastewater is extracted from the wastewater tank through the suction channel, the connecting line, and the suction pump by means of the suction pump, and wastewater is flushed from the wastewater tank through the flushing channel.

SUMMARY OF THE INVENTION

According to the invention, a device for removing the wastewater from a wastewater tank is provided which basically removes the wastewater by means of an extraction process from the wastewater tank. To that end, a suction channel is provided which extends into the wastewater tank from a suction adapter. The suction adapter is mounted on the wastewater tank, preferably at its upper tank wall. The suction channel extends into the interior of the wastewater tank and has a suction port at its end. This makes it possible to suck all or almost all of the wastewater from the wastewater tank, in that the suction channel extends so far in the direction of the bottom of the wastewater tank that the suction port is only a slight distance away from the inner surface of the bottom of the wastewater tank.

This way of extracting the wastewater hygienically and free of soiling by means of such a suction channel combines the suction unit according to the invention with a flushing channel and a pump control unit which controls such an extraction process in such a way that solids are also released from the wastewater tank and can be extracted. To that end, a flushing channel extends into the wastewater tank, by means of which flushing channel the wastewater tank can be flushed. The flushing channel may be designed as a separate channel from the suction channel, which is provided, for example, as a flushing channel arranged to the side of the suction channel, or as a flushing channel arranged concentrically inside the suction channel, or as a flushing channel arranged around the suction channel and having an annular cross section. When the flushing channel and the suction channel are provided separately in this manner, it is possible for the extracted water and the flush water to be conducted separately, with extraction and flushing being carried out with an interval between them, or simultaneously.

According to the invention, the pump control unit is configured to control an extraction process in preferably a first step, to control a flushing process in preferably a second step, and to control an extraction process in preferably a third step. It should be understood in this regard that the third step is preferably carried out after the second step, and that the second is preferably carried out after the first step. However, the steps may also be carried out in any other order, in principle. For example, the flushing process in the second step can be carried out before the extraction process in the first step, in that flushing with turbulence is carried out when the wastewater tank is full, followed by complete extraction, so that the first and third steps are carried out as a joint, integral step. To achieve efficient extraction, it is preferable in the case of many applications and geometries of wastewater tanks, however, that the wastewater is firstly extracted in the first step, followed by flushing in the second step that then follows, and that, in a subsequent third and final step, flush water and agitated solids and residual wastewater are extracted. It should be understood, as a basic principle, that when the suction channel and flushing channel are provided separately, it is also possible for the steps to be controlled in such a way that they overlap, that is to say that while wastewater is being sucked out through the suction channel in the first or third steps, it is possible for flushing to be carried out through the flushing channel in the second step, thus achieving greater efficiency in extracting the wastewater and the solids dispersed therein by partial or complete overlapping of the steps, for specific geometries of wastewater tank or compositions of wastewater.

In addition to the suction channel and flushing channel being provided separately, it is also possible for the suction channel and flushing channel to be provided in integral form. In this integral embodiment, both extraction and flushing are carried out by a common channel extending into the wastewater tank.

The pump control unit, more particularly, is an electronic controller that allows the extraction and flushing processes to be controlled. This control may be fully or semi-automatic, or, alternatively, some form of manual control. The suction pump and any flushing pump that may also be provided are controlled in a desired manner such that the wastewater tank is emptied and flushed in such a way that any solids deposited therein are dispersed and removed from the wastewater tank. This can be done in a simple manner by a user who manually switches back and forth between extraction and flushing, or by automatic control processes in which control is based on volume, time, or by respective sensors that sense a filling level, an extraction vacuum, a flushing pressure, a volumetric extraction flow rate, or the like.

According to a first preferred embodiment, the pump control unit is configured to control an extraction process in such a way that the extraction process is performed in a first step, the flushing process is carried out in a second step after or during the extraction process, and wastewater is extracted from the wastewater tank through the suction channel, the connecting line and the suction pump by means of the suction pump in a third step after or during the flushing operation. According to this embodiment, flushing is carried out before or during extraction, and extraction is carried out during or after flushing, which can be a continuous extraction process or a second extraction process.

It is further preferred that the suction pump is designed as a suction and flushing pump, and that the pump control unit is configured to control the suction pump in such a way that wastewater is extracted from the wastewater tank through the suction channel and the connecting line in a first step, the conveying direction of the suction pump is reversed and wastewater is flushed from the wastewater tank through the flushing channel in a second step, and the conveying direction of the suction pump is reversed yet again and wastewater is extracted from the wastewater tank through the suction channel and the connecting line in a third step. According to this embodiment, both the extraction process and the flushing process are carried out by the suction pump. This embodiment is basically suitable when the flushing channel and suction channel are integrally embodied. When integrally embodied, extracted wastewater and flush water can be channeled through a single connecting line to an integrally embodied flushing and suction channel, via which both extraction and flushing is carried out. When the channels are separately embodied, respective valves are necessary in order to cause the wastewater to be extracted from the suction channel during the extraction process and to provide flushing through the flushing channel during the flushing process when the flow direction of the suction pump is reversed accordingly. This can be done by switched valves or by respective non-return valves.

It is still further preferred that the flushing channel has a peripheral rim which surrounds an axial opening and has at least one, preferably more than one, axially extending peripheral recess(es), has a plurality of radial openings, or has a rotatable mounted nozzle that is designed to be rotated by the water flowing through the suction channel during the flushing process and which allows the flush water to flow out in a direction having radial directional components at a rotating angle about the longitudinal axis of the suction channel. It should be understood, as a basic principle, that these specified directions relate to the longitudinal axis of the flushing channel in the region of the discharge opening. A plurality of radial openings and a rotating nozzle can release, agitate, and disperse deposits in a similarly efficacious manner. Designing the flushing channel in this way provides very efficient flushing, in that a thin jet of flush water discharged at high speed, or a plurality of such thin jets of flush water discharged at high speed are generated, which can efficaciously release and agitate any deposited solids from the bottom of the tank. It should be understood in this regard that the flush water can escape radially from the flushing channel and that this discharge preferably takes place close to the bottom of the tank in order to efficaciously release and agitate the solids. However, the flush water can also be discharged radially and axially, or radially and tangentially, or radially, axially, and tangentially in relation to the longitudinal extension of the flushing channel.

It is still further preferred that the suction channel is shaped in the region of the suction port as a suction hood having an inner diameter that is greater than the diameter of the suction channel in the region of the adapter. Such a suction hood is used for efficaciously extracting wastewater from the wastewater tank and is formed by enlarging the cross section of the suction channel in its lower portion, adjacent the suction port.

It is still further preferred that the suction channel is made of rubbery elastic material in the region of the suction port. Such a variant made of a rubbery elastic material makes it easier to install the suction channel, while on the other hand any deformations of the rubbery elastic material during the extraction process causes anything adhering to it to be detached, thus reducing the risk of blockage by deposits which form.

According to another preferred embodiment, the suction channel and the flushing channel are designed as an integral suction and flushing channel, and the suction adapter and the flush adapter are designed as an integral extraction and flush adapter from which the integral suction and flushing channel extends. This embodiment provides an integral design for the suction channel and the flushing channel, with an integral design accordingly for the suction adapter and the flush adapter. Extraction and flushing, therefore, occur through one and the same channel with this design, so extraction and flushing with a time interval therebetween, or successively, is realized. This design is particularly suitable whenever the extracted wastewater is discharged and the flush water is supplied through a single connecting line and the extraction process and the flushing process are carried out by a single suction pump with a reversible feeding direction, thus allowing a compact structure and an economically efficient and cost-efficient construction, not only in respect of the wastewater tank, but also in respect of the suction unit. It should be understood in this regard that the integral extraction and flushing channel can combine the flushing channel designs and the suction channel designs described in the foregoing, in order to have the respective advantages for the extraction process and the flushing process.

It is still further preferred that the suction pump is connected on the connector side opposite the connecting line to a wastewater line and to a flush water line via a valve mechanism. According to this embodiment, the suction pump is connected not only to a discharge line for the wastewater, but also to a supply line for the flush water so that, alternatively, depending on the step being performed, the suction pump can discharge the extracted wastewater, or flush water can be fed to the suction pump. Although in principle the flushing process can also be carried out with the wastewater extracted from the wastewater tank, by reversing the feeding direction of the suction pump, in many applications this has disadvantages or requires additional effort and expense to allow the respective flow management in the wastewater line. It should be understood, as a basic principle, that the flush water can be provided from a separate flush water tank or from a flush water line. The valve mechanism provided here is used to switch accordingly between the wastewater line and the flush water line, in order to provide the connection, depending on the feeding direction and pressure level produced by the pump, either by switching or by means of respective non-return valves.

It is preferred in this regard that the valve mechanism is designed to connect the suction pump to the wastewater line during the first and third steps and to the flush water line during the second step. According to this embodiment, the valve mechanism is designed to ensure that the wastewater is fed into the wastewater line and to ensure that flush water is fed from the flush water line. This can be effected by switching the valve mechanism simultaneously with the reversal in feed direction, or by a passive valve mechanism which effectively causes the same switching by means of non-return valves, depending on pressure conditions.

It is still further preferred that the valve mechanism is designed to block the entry of wastewater into the flushing line. This embodiment ensures that no wastewater enters the flush water line, and is advantageous or prescribed for many ways of connecting, so as to prevent any microbial contamination in the flush water area. When the valve mechanism is designed in such a way, the flush water can be taken from a drinking water network, because microbial contamination of the drinking water network by the extracted wastewater is reliably prevented by the valve mechanism.

It is still further preferred that the valve mechanism includes a system separator which is connected to a drinking water line and which provides the drinking water drawn from said line as flush water and blocks the entry of flush water or wastewater into the drinking water line. Such a system separator allows drinking water to be safely taken from a drinking water network and to be supplied as flush water to the suction unit, despite the drinking water and the extracted wastewater being conducted in a common pipeline inside the suction unit, because any backward microbial contamination of the drinking water network can be precluded reliably by the system separator.

It is still further preferred that the suction pump is a rotary lobe pump that is controlled by the pump control unit so that it reverses its direction of rotation between the first and the second steps and between the second and the third steps. Providing the suction pump in the form of a rotary lobe pump has the advantage that the rotary lobe pump is well able to convey liquids laden with solids in a reliable manner and with little wear and tear. Being a displacement pump, the rotary lobe pump is also self-priming and its direction of feeding can be switched by reversing the direction in which the rotary lobes rotate. The rotary lobe pump generally has the same feed rate in both feeding directions and thus ensures not only efficacious and efficient extraction, but also strong flushing of the wastewater tank. Finally, the rotary lobe pump is characterized by neutral start-up behavior and can be switched within a very short time from standstill to a feed rate in one direction of flow, and from the full feed rate in that direction of flow to a full feed rate in the opposite direction of flow.

The invention can be developed by adding an aeration and air extraction unit that allows air to enter the wastewater tank during the extraction process and that allows air to escape from the wastewater tank during the flushing process, said aeration and air extraction unit preferably being formed in the flange connection. It should be understood, as a basic principle, that this aeration and air extraction unit can be disposed directly in the wall of the wastewater tank, at a distance from the extraction flange and the flush adapter, or may be provided in the suction adapter, in the flush adapter, or in both, or split between those two flanges. Aeration and air extraction can be carried out, in principle, by an integral aeration element, or by two separate elements, one for aeration and the other for air extraction. Aeration and air extraction is advantageous for preventing damage to the wastewater tank of the inventive device, in order to prevent a user having to open a separate opening before the extraction process to allow air to enter and leave the wastewater tank. Aeration and air extraction thus provide a high level of operational safety, without the risk of damage to the wastewater tank as a result of operating errors, if too high a vacuum is produced in the wastewater tank during the extraction process due to a lack of aeration, or if excessive overpressure is generated during the flushing process due to a lack of air extraction, which would lead to corresponding damage.

Another aspect of the invention concerns a method for sucking wastewater from a wastewater tank, comprising the steps of: (a) sucking the wastewater out of the wastewater tank by means of a suction pump in a direction of extraction through a suction channel which extends into the wastewater tank, preferably to some millimeters above the inner floor of the wastewater tank; (b) flushing the wastewater tank via a flushing channel in a flushing direction opposite to the direction of extraction; (c) sucking the flush water and wastewater out of the wastewater tank by means of the suction pump in the direction of extraction through the suction channel. In the method according to the invention, wastewater laden with solids, and any deposits of solids in the wastewater tank, are efficaciously extracted by conducting a combined extraction and flushing process. A sequence of extraction, flushing, and extraction can preferably be carried out in this regard, although said sequence can also be carried out as flushing, followed by extraction, or the extraction process and the flushing process can partly overlap. It should be understood, as a basic principle, that the method for extracting wastewater can preferably be carried out with the previously described suction unit and the steps which can be achieved with the respective features of the suction unit can be carried out advantageously in the method according to the invention.

It is particularly preferred that the pumping direction of the suction pump is changed between steps (a) and (b) and between steps (b) and (c).

It is further preferred that in step (b), the wastewater tank is flushed close to the bottom by means of at least one jet of flush water guided radially out of the flushing channel.

It is still further preferred that the suction channel and the flushing channel are formed by an integral suction and flushing channel and that the suction in steps (a) and (c) and the flushing in step (b) are performed by the suction pump via the suction and flushing channel.

Finally, it is further preferred in the method according to the invention that flushing with flush water is performed in step (b), and that the method further comprises the step of providing flush water from a source of freshwater, and separating the system consisting of the wastewater conduits and the source of freshwater in order to prevent any backflow of wastewater to the source of freshwater.

The invention also relates to a waste disposal station for a vehicle, comprising a suction unit which comprises a feed pump that is connected on the inlet side to a first end of a suction hose, and a positionable waste disposal unit which is movable relative to the feed pump and comprises a collecting basin and a suction port.

Waste disposal stations of this kind are used for the disposal of fluids, such as gray water, black water, and the like, from vehicles, in particular from trucks or from touring vehicles, such as campervans or coaches. Such vehicles are generally fitted with a wastewater tank disposed inside the vehicle, for receiving the gray water, the black water, and the like. Depending on the size of the vehicle, the wastewater tank may have a capacity of up to 200 liters. Many vehicles have a drainage opening under the vehicle for emptying the wastewater tank with a large capacity, and thus for disposing of the fluid contained therein.

Until now, it was common practice simply to position this drainage opening for the disposal process over a rainwater drainage grate embedded in the road, for example a storm drain inlet, and then to open the drainage opening, for example by means of a valve inside the vehicle. The fluid inside the wastewater tank was then channeled into the storm drain by the force of gravity and from there into the public wastewater network.

Disadvantages associated with this kind of disposal are that it may have adverse effects on the surroundings, particularly in the form of splashes and odors, and that positioning above the storm drain is usually problematic and involves time-consuming maneuvering of the vehicle. The rainwater drainage grate can also accumulate dirt in the form of solids or fibers and become clogged as a result, and it is not desirable for pollution reasons to channel wastewater in such a high concentration from such mobile sanitary facilities into the public wastewater network via a rainwater drainage grate.

In order to improve this disposal process, DE 10 2010 032 852 A1 discloses a service station for disposing of fecal matter and/or gray water from touring vehicles, comprising a receiving basin which is open at the top, a discharge member connected thereto, and a guide member for a free end of the discharge member, wherein the free end of the discharge member can be made to interact with a connection member of a wastewater collection tank or a sewer, and wherein the free end of the discharge member is mounted so as to be pivotable relative to the connection member about an axis. To dispose of the wastewater, the vehicle is roughly positioned first of all in a parked position for disposal. The collecting basin is then positioned underneath a drainage opening of a vehicle wastewater tank, by pivoting it to the respective position for disposal. The drainage opening of the vehicle is then opened. The fluid in the vehicle wastewater tank runs in free fall into the receiving basin and is channeled via the discharge member and the connection member into the wastewater collecting tank or the sewer.

However, the disadvantage of this service station is that the position of the vehicle wastewater tank and the drainage opening is not the same for every vehicle. In the case of coaches, for example, the drainage opening may be arranged in the middle of the left- or right-hand side of the vehicle, but there are also variants where the drainage opening is on the vehicle wastewater tank at the rear of the vehicle. In the latter case, it is difficult to position the service station with a pivotable axis, as described above, because the tires of the vehicle may disturb or even prevent such pivoting in the rear area of the vehicle.

DE 20 2015 103 442 U1 discloses a freely positionable waste disposal unit for disposing of gray water and/or black water from a vehicle, comprising a collecting basin having an upper basin opening and a drainage opening, and a discharge line having a first end connected to the drainage opening, and a second end, the waste disposal unit having a positioning device which is adapted to move the collecting basin freely from a non-operating position to an operating position. The positioning device has a suction hose which is securely connected thereto and which is securely connected to the discharge line of the waste disposal unit. The discharge line is substantially horizontal or downwardly sloping underneath the collecting basin to allow the gray water and/or black water to drain out of the collecting basin, preferably under the force of gravity.

One disadvantage of this variant is that the hose which is securely attached to the positioning device is difficult or complicated to handle and that it is not possible to provide a detachable connection with the suction hose, because gray water and/or black water which has not drained off or been extracted would drip onto the ground by releasing the connection. Furthermore, the positioning device cannot be secured against theft, or accommodated in a frostproof manner inside a compact housing and without some kind of garage. Nor is it possible to prevent trash from being thrown into the opening of the positioning device, or to prevent fecal matter from being discharged due to incorrect positioning beside the opening of the collecting basin. It is also disadvantageous that the depth of the collecting basin is limited by the discharge line. The discharge line arranged underneath the collecting basin cannot be fully emptied either, thus resulting in a risk of frost and in the possibility of odors being produced.

More and more wastewater tanks in vehicles also have an integrated suction coupling which allows a suction hose to be connected and which allows gray water and/or black water to be extracted from the wastewater tank. The suction coupling is often provided instead of a drainage port, so it is not possible in many cases for drainage to be carried out under the force of gravity. Due to the trend in the design of vehicle wastewater tanks, it is increasingly necessary that, in addition to the waste disposal unit with a positioning device, a further device adapted to extract gray water and/or black water directly from the vehicle wastewater tank be installed at a waste disposal site.

It is, therefore, an object of the present invention to provide a waste disposal station which can be operated without external personnel and which allows convenient disposal of the gray water and/or black water from sanitary facilities onboard vehicles. Another object of the invention is to provide a compact and versatile waste disposal station which allows not only the drainage but also the extraction of gray water and/or black water from a vehicle wastewater tank.

This object is achieved, according to the invention, by a waste disposal station of the kind initially specified and having the features of the suction unit described above. In particular, the waste disposal station comprises a suction unit, preferably a suction unit according to any of the previously described embodiments, comprising a feed pump that is connected on the inlet side to a first end of a suction hose.

This configuration allows the wastewater to be sucked out of a wastewater tank, in particular by means of the suction coupling which is inserted into the wastewater tank from above.

In order to be able to collect water which is drained from a wastewater tank also or only by means of the waste disposal unit, a positionable waste disposal unit which is movable relative to the feed pump and comprises a collecting basin and a suction port may be provided additionally or alternatively. The collecting basin according to the invention has an upper rim, a basin wall extending from the upper rim to a bottom floor of the collecting basin, and a discharge unit. The suction port according to the invention is also connected by means of a discharge line to the discharge unit of the collecting basin. According to the invention, the suction port is arranged above the upper rim of the collecting basin in the direction of gravity. According to the invention, a second end of the suction hose, which has a first coupling element, can be releasably coupled to a second coupling element formed at the suction port. The wastewater can be sucked out of the collecting basin preferably by means of a suction unit according to one of the previously described embodiments.

The invention is based on the idea of providing a waste disposal station for disposing of fluids such as gray water, black water, and the like from vehicles, in particular, from trucks or touring vehicles such as campervans or coaches, said waste disposal station comprising not only the positionable waste disposal unit for wastewater tanks having a drainage port, but also the suction unit for wastewater tanks having a suction coupling, thus ensuring maximum versatility in one application. The waste disposal station according to the invention is also meant to be operable with only one drive unit. For that reason, the suction hose according to the invention is designed so that it can be releasably coupled.

A positionable waste disposal unit which can be moved relative to the feed pump can be understood here to be a unit with the collecting basin, which is equipped with a handle and at least one roller, preferably a caster wheel, so as to be mobile on the tire contact area of the vehicle and thus being movable from a non-operating position to an operating position, without the feed pump itself having to be moved. The unit comprising the positionable waste disposal unit which is movable relative to the feed pump is preferably designed as a frame with the caster wheels, such that it resembles a trolley. It is particularly preferred that the caster wheels are mounted pivotably about an axis extending parallel to the direction of gravity. This ensures that the unit can be moved in all directions. The caster wheel preferably has a fixing means which is preferably designed as a total stopper for the caster wheel. The fixing means may be designed to fix the positionable waste disposal unit in one position, preferably in an operating position. It is further preferred that the unit has a frame that extends along a vertical plane and may be provided with a handle. This handle allows the unit to be positioned more easily, with the result that the unit can be moved more easily on the tire contact area of the vehicle. The floor of the collecting basin may also be designed to slope downward relative to a horizontal plane, in particular in the area of the discharge unit, and may have a plurality of guiding areas which may also be designed so that they likewise slope downward relative to a horizontal plane to the region of the discharge unit, such that the floor is a kind of "guide channel" for the fluid in the direction of the discharge unit. The discharge unit may preferably be arranged at the lowest point of the floor. The collecting basin may be adjustable in height.

According to the invention, the collecting basin has a discharge unit that is adapted to discharge wastewater in the form of gray water, black water, and/or the like out of the collecting basin via the discharge line to the suction port. Such a discharge unit may be a device of any appropriate kind which is designed to discharge wastewater from the collecting basin either actively by extraction, for example by sucking out or pumping out the wastewater, or passively, using the force of gravity. This device may be designed, for example, as a pump, a suction unit, or also as a discharge opening facing downward in the direction of gravity. The discharge line may be provided in the form of a tube made of stainless steel or plastic, or alternatively in the form of a telescoping pipe.

The discharge line of the waste disposal unit is so designed, according to the invention, that the suction port is arranged at least above a height of the upper rim of the collecting basin, preferably at the height of an operator's knee, between 300 and 800 mm above a tire contact area of the vehicle, and particularly preferably 500 mm above the tire contact area of the vehicle, and is preferably oriented in an upward direction. Due to the height and the orientation of the suction port, unextracted gray water and/or black water cannot reach the tire contact area of the vehicle.

The operating position of the waste disposal station should be understood as a position into which all the components of the waste disposal station that are needed for a disposal process must be brought in order to be able to start the disposal process and thus to start an extraction process. In that position, the vehicle is in a parked position for disposal. When the vehicle wastewater tank has the drainage port, then the waste disposal unit must be positioned, oriented, and fixed in the operating position by the fixing device of the caster wheel in such a way that the collecting basin is arranged underneath the drainage opening. As a result, wastewater exiting from the drainage port can then flow in the direction of gravity through an opening in the collecting basin into an interior of the collecting basin. The suction hose must also be connected to the suction port so that it is able to remove the gray water and/or black water, preferably continuously via the discharge line by means of the discharge unit disposed in the collecting basin. However, when the vehicle wastewater tank has the suction coupling instead of the drainage coupling, then all that is necessary in the operating position is to connect the suction hose to the suction coupling so that the wastewater can be removed directly from the vehicle wastewater tank. The operating position thus describes the position of the components of the waste disposal station, in which the waste disposal station can be put into operation. Whereby, putting into operation is thus an operating state and is to be understood as meaning that the feed pump which is connected to the suction hose is activated so that the fluid from the wastewater tank of the vehicle can be removed by the waste disposal station. The non-operating position is thus to be understood as a position in which it is not possible or desirable for the suction unit to carry out an extraction process according to the invention.

In the latter position, the waste disposal unit is not positioned and aligned underneath the drainage port of the wastewater tank, and/or the suction hose is not connected to the suction port or the suction coupling of the wastewater tank. In the non-operating position, the suction hose can preferably be connected in a storage position to a first receiving unit that secures the suction hose to the waste disposal station. The non-operating position thus describes the position of one, several, all, or all of the necessary components of the waste disposal station in which the waste disposal station cannot be put into operation. Accordingly, a non-operating state of the waste disposal unit is to be understood as a state of the disposal device in which one, several, all, or all of the necessary components of the waste disposal station are in the non-operating position, with the result that the feed pump has not been nor can be put into operation.

According to the invention, the suction unit comprising a feed pump and a suction hose is provided to extract gray water and/or black water either from the positionable waste disposal unit or from the wastewater tank of the vehicle itself. On the inlet side, according to the invention, the first end of the suction hose is connected to the feed pump. The feed pump has proved to be particularly advantageous in order to allow efficient disposal of the gray water and/or the black water, in particular, when a receptacle, for example, in the form of a wastewater collection tank for the fluid removed from the vehicle wastewater tank, is arranged slightly higher, that is to say is above the collecting basin in the direction of gravity. In these cases, it is no longer possible for the fluid to be channeled into the tank purely by the force of gravity. According to the invention, the feed pump is activated during the disposal process so as to remove the fluid from the collecting basin or from the wastewater tank of the vehicle. Due to the suction force which is produced, it is possible to prevent splashes escaping from the collecting basin and odors from ensuing during extraction via the waste disposal unit.

According to a first preferred embodiment, the discharge unit is designed as a suction coupling that is arranged in the collecting basin, more particularly, in the region of the lower floor, and includes the suction coupling. By means of this embodiment, the wastewater can be sucked directly out of the collecting basin without larger residues being left behind in the collecting basin or in the discharge line. By preventing such residues, it is possible to prevent odors and any risk of frost from arising. Alternatively, the collecting basin may have a drainage hole formed downward in the direction of gravity, preferably on the floor of the collecting basin, which slopes downward relative to a horizontal plane. The drainage hole may be connected via the discharge line to the suction port. Such a drainage hole allows the wastewater to be drained from the collecting basin by the force of gravity. The connections between the collecting basin and the drainage hole, between the drainage hole and the discharge line, and between the suction line and the suction port may preferably be designed as sealing connections, for example, by a seal provided by appropriate sealing rings.

According to another preferred embodiment, the waste disposal station includes a wastewater discharge pipe which can be connected to a tank for receiving a fluid which can be discharged through the suction hose, and/or to a connection to the sewer system. On the outlet side, the feed pump is connected to the wastewater discharge pipe via a connection port. With this configuration, the feed pump is connected via the wastewater discharge pipe to the tank, which is preferably designed as a wastewater collecting tank, and/or to the connection to the sewer system, in order to dispose of extracted wastewater and/or fecal matter in the sewer system or the tank.

According to another preferred embodiment, the waste disposal station comprises a housing which encloses one element, several elements or all the elements of the waste disposal station and which has an insulating layer and/or a heater. Insulation may be applied as a self-adhesive foam mat, for example, or by spraying a foam, and the large housing walls or the entire housing may alternatively or additionally be made of a sandwich material.

Such a housing may be designed as a console. The waste disposal station may thus be provided in the form of a filling pump and can be installed, for example, at gas stations beside a conventional gasoline pump or on car parks, bus depots, coach stations, campsites, or the like. The waste disposal station with such a housing has a compact construction and is protected against weather and/or vandalism.

The heater inside the housing allows the waste disposal station to be operated without further ado even under frosty temperatures, in particular, without any disruptions or waiting periods, because the heater can prevent fluids of whatever kind from freezing. By heating the collecting basin, the suction unit, and pipelines of whatever kind, it is also possible to prevent the fluids, which are channeled into them, in particular, water, from cooling and freezing as the fluids progress through such pipelines, and thus to prevent the fluids from blocking or even destroying the pipelines or the collecting basin. It is preferred that the heater has a temperature sensor for measuring a temperature and comparing it with a preset temperature. The heater is controlled by activating and deactivating it in such a way that the heater keeps the temperature in the surroundings of the temperature sensor at the preset temperature. The heater can also be designed in such a way that it allows cooling to be carried out. A second temperature sensor may preferably be mounted on the outside of the waste disposal station.

Due to the housing being insulated and heatable, ambient temperatures ranging from −20° C. to +55° C. can be compensated for, and a substantially constant temperature inside the waste disposal station can be ensured. It is possible in this way to prevent the contents of the wastewater tank from heating up, due to insulation, for example, and from odors being intensified as a result. It is particularly preferred that the first coupling element of the second hose end is selectively and releasably coupled to the second coupling element disposed around the suction port, or to a third coupling element which is disposed around a suction coupling of a wastewater tank of the vehicle. The waste disposal station thus provides the advantage of greater flexibility, because the gray water and/or black water can be drained and sucked directly out of the wastewater tank of the vehicle. Whether the wastewater tank has a drainage port or a suction coupling, therefore, plays no role, because the second end of the suction hose can be releasably connected to the suction port of the positionable waste disposal unit and also to the suction coupling of the vehicle wastewater tank. In this way, the suction hose can be used, according to the invention, on its own or in combination with the positionable waste disposal unit. The waste disposal station also has high standards of hygiene and aesthetics, as it prevents splashes or unhygienic and unpleasant odors and views.

The first coupling member is preferably embodied as a coupling element. Furthermore, the second coupling element is a matching coupling element, which is preferably designed as a first coupler pocket. Like the second coupling element, the suction coupling of the vehicle is likewise a matching third coupling element, preferably a second coupler pocket, wherein the second coupling element and the third coupling element can be brought into releasable engagement with the first coupling element. The coupling pockets each have an insertion hole for the matching coupling members. A coupling consisting of such coupling members and coupler pockets is used for flexible use of the suction hose. According to the invention, such couplings are separable to allow the coupling members to be joined and released in a rational, quick, and reliable manner.

The coupling is preferably designed as a camlock coupling consisting of a male part, the coupling member, and a female part, the coupler pocket. Alternatively, plug nipple connections or bayonet catches may be provided. The second and the third coupling element are identical in design to allow the connection to the first coupling element. Due to this design, the suction hose can be releasably connected to the suction port of the waste disposal unit and also to the suction coupling of the vehicle wastewater tank.

In another preferred embodiment, the feed pump connected to the first end of the suction hose is a rotary lobe pump.

It is particularly preferred that the waste disposal station includes the wastewater collecting tank for receiving the fluid which is extracted through the suction line. The waste disposal station may be stationary, but it may also be mobile, without having to dispense with the advantages of a stationary waste disposal station. Regardless of whether the waste disposal station is stationary or mobile, the wastewater collecting tank for receiving the fluid from the wastewater tank of the vehicle is provided with such a large capacity that the entire filled volume of the vehicle wastewater tank can be sucked into the wastewater collecting tank. It is particularly preferred that such a wastewater collecting tank has a filled volume of at least 2000 liters. The wastewater collecting tank can be located underground so that the fluid can be guided simply by means of gravity into the wastewater collecting tank. As an alternative thereto, however, the wastewater collecting tank can also be located aboveground, in particular, in a raised position relative to the collecting basin. In this case, the feed pump, more particularly, the rotary lobe pump, conducts the fluid into the wastewater collecting tank. In this configuration, the rotary lobe pump can be connected on the outlet side via the wastewater discharge pipe to the wastewater collecting tank, and can produce an underpressure inside the wastewater collection tank. Due to the underpressure produced in the wastewater collecting tank, the fluid can be sucked out of the collecting basin into the wastewater collecting tank. The wastewater collecting tank may be replaceable and/or drainable, preferably connected to a sewer system and designed to be automatically drainable.

It is particularly preferred that a first enclosure for receiving the waste disposal unit is provided in the waste disposal station, in which at least portions of the waste disposal unit are removably stored when the waste disposal unit is in a parked position. Due to this design, the positionable waste disposal unit can be inserted in the non-operating state into the waste disposal station and thus into the parked position. The parked position describes the position of the waste disposal unit in which all the portions of the waste disposal station are located in the first enclosure. It is preferable that the collecting basin can be closed in this way. Inserting the waste disposal unit into the first enclosure allows it to be protected against theft and vandalism and to be protected against weather conditions. It is also possible to prevent fecal matter and/or wastewater from being introduced into the collecting basin in the non-operating state, or that the collecting basin is misused as a garbage can. According to this variant, the waste disposal station has a compact, space-saving construction.

It is particularly preferred when the waste disposal station has a first receiving unit for receiving the first coupling element in a storage position, in which the first coupling member is arranged above the feed pump in the direction of gravity and in which the first coupling member is arranged vertically above the collecting basin when the waste disposal unit is in the parked position. In this case, the first receiving unit may be provided in the first enclosure. By such high positioning of the first coupling element and thus of one end of the suction hose in the storage position, it is possible to prevent unextracted wastewater from dripping onto the tire contact area or into the first enclosure.

It is also preferred for the waste disposal unit to be positioned underneath the suction unit, preferably in the region of the tire contact area of the vehicle. This allows the positionable waste disposal unit, which is preferably designed like a trolley, to be pushed in and out easily on the tire contact area of the vehicle. Neither external personnel nor application of a large force is necessary, therefore, to position the waste disposal unit.

It is also preferred that the waste disposal unit, in the parked position, is secured inside the first enclosure by means of a first locking bolt, which can be electrically or mechanically released. By securing the waste disposal unit in the parked position, it is possible to prevent the waste disposal unit from being pulled out of the waste disposal station improperly. It is particularly preferred that the locking bolt can be coupled in signal communication with the waste disposal station, in particular, with the feed pump. As a result, it is only by putting the waste disposal station into operation, and, in particular, by activating the feed pump, that it is possible to unlock the waste disposal unit. The locking bolt may be attached in the form of a safety bar at the end of the waste disposal unit, which can firstly be inserted into the first enclosure such that it lies opposite the suction port and the handle. The safety bar is provided preferably on the outer wall of the collecting basin and in a middle position in the horizontal direction.

According to another preferred embodiment, the waste disposal station is designed as a supply station and comprises a tap water hose, which can be pulled out from a storage position into a supply position, and/or a freshwater hose, which can be pulled out from a storage position into a supply position. This embodiment allows an operator to access a tap water supply and/or a freshwater supply.

The storage position describes a position of the tap water hose, or the freshwater hose, in the non-operating position, in which a substantial portion of the respective hose is disposed inside the waste disposal station and only one end of the hose protrudes out of a respective receiving opening.

Hoses can be guided though such receiving openings from the inside of the waste disposal to allow an operator to access the respective hose from the outside. Such receiving openings may also be designed in such a way that the hoses can be prevented from slipping back inside the waste disposal station. In the storage position, the freshwater hose and the tap water hose may preferably be connected to a respective receiving unit which secures the respective hose to the waste disposal station. The receiving unit may have a coupling element which is preferably designed to match the respective coupling element of the hose. Alternatively, hoses may also project loosely from the respective receiving opening. Accordingly, a supply position is to be understood as a position of the tap water hose, or the freshwater hose in the operating position, in which a significant part of the respective hose is pulled out from the interior of the waste disposal station through the respective receiving opening.

If the waste disposal station is a mobile waste disposal station, a tap water tank may be provided that is connected to the tap water hose so as to provide a tap water supply and thus to allow a tap water tank on the vehicle to be filled. Analogously thereto, a freshwater tank may be provided that is connected to the freshwater hose so as to provide a supply of freshwater and thus to allow a freshwater tank on the vehicle to be filled. The tap water tank and the freshwater tank may be disposed on the waste disposal station. The tap water tank and the freshwater tank may preferably be accommodated inside the console. The tap water tank and the freshwater tank may be refillable or they may also be connected to a tap water supply line or freshwater supply line, respectively, in order to provide a continuous supply of tap water and/or freshwater.

Freshwater can preferably be understood to mean drinking water. The waste disposal station can be connected to a drinking water network, and the supply of freshwater can be ensured by a system pressure in the drinking water network.

In another preferred embodiment, a connection of the freshwater hose to the supply of freshwater and/or a connection of the tap water hose to the tap water supply each has a metering unit for measuring the volume of freshwater or tap water that has been supplied. These measurements can then be used to calculate any costs incurred by the user for refilling a freshwater tank or the tap water tank on the vehicle. Such metering units can be provided in the form of water meters.

In one preferred development of the invention, the freshwater hose can be automatically flushed at regular intervals to ensure a standard of hygiene, particularly whenever the freshwater hose has not been used for two or three days. In this preferred development of the invention, the receiving unit for attaching the freshwater hose to the waste disposal station may be connected to a freshwater flushing hose that is connectable on the outlet side to a tank provided for that purpose in the form of a collecting tank for freshwater to be disposed of. A first shutoff device having a first valve may also be provided in the inner space of the waste disposal station, downstream from the connection to the drinking water network, and a second shutoff device having a second valve may be provided downstream from the first shutoff device. The first shutoff device with the first valve can be connected on the outlet side to a first freshwater discharge line. The first freshwater discharge line, which is connected on the inlet side to a freshwater supply line via the first shutoff device and the first valve, may be connected on the outlet side to a system separator. The second shutoff device with the second valve may be connected on the outlet side to a second freshwater discharge line. The second freshwater discharge line, which is connected on the inlet side to the freshwater supply line via the second shutoff device and the second valve, may be connected on the outlet side to the collecting tank. In this regard, the freshwater supply line describes the pipeline that is connected to the freshwater tank and/or to the drinking water network. The collecting tank may be equipped, particularly preferably, with a float switch.

Tap water can preferably be supplied via the system separator, preferably of category 5 or AA, and it is particularly preferred if the latter can be equipped with a submersible pump. The system separator may be connected on the inlet side to the first freshwater discharge line to prevent non-freshwater, which is fed into the system separator, from flowing back into the freshwater supply due to changes in pressure and thus prevent germs from entering the freshwater network. The system separator may also be connected to the collecting tank via a pipeline, in order to feed water that is not to be used into the collecting tank.

In one preferred embodiment, the collecting tank is connected on the outlet side to the feed pump via a discharge line having a further shutoff device, in order to dispose of the water that has collected in the collecting tank together with the wastewater discharged from the vehicle, or via the same wastewater discharge pipe, at least. The shutoff device, which is opened only when water has to be drained from the collecting tank, can prevent parts of the wastewater from entering the collecting tank.

In one preferred development of the invention, the waste disposal station may also include a flushing unit. The flushing unit may preferably be connectable to the tap water hose or may be formed from the tap water hose. The flushing unit may be designed to flush the collecting basin of the positionable waste disposal unit. For that purpose, the collecting basin may include an inlet opening that is connected to the flushing unit by means of a flush water line, preferably in the form of a hose. Flush water can be fed via the flush water line and through the inlet opening into the collecting basin. The collecting basin can be cleaned by flushing it, preferably continuously. More particularly, this flush water line may be put under a high overpressure and may be so designed that an underpressure is produced in the collecting basin, thus producing a suction effect. This can counteract the formation and spreading of unpleasant odors and can also result in and intensify reliable discharge of the gray water and/or wastewater from the collecting basin. Alternatively, the tap water hose may be used for manually flushing a toilet bowl of the vehicle during the extraction process. It may be possible in this way to obviate the need for subsequent flushing of the collecting basin.

It is particularly preferred that a second enclosure adapted to receive the suction hose and, if necessary, the tap water hose, is provided in the waste disposal station. It is also preferred that a substantial portion of the suction hose is stored inside a first receiving opening and can be pulled out from the first receiving opening, and that, where applicable, a substantial portion of the tap water hose is stored inside a second receiving opening and can be pulled out from the second receiving opening. The second enclosure including the first and the second receiving opening for receiving the removable suction hose and the removable tap water hose ensures that the waste disposal station is of compact design.

It is preferred that a third enclosure for receiving the freshwater hose is provided in the waste disposal station. It is further preferred that a substantial portion of the freshwater hose is stored inside a third receiving opening and can be pulled out from the third receiving opening. The enclosure including the third receiving opening for receiving the removable freshwater hose ensures that the waste disposal station is of compact design. By accommodating the freshwater hose in a separate enclosure, it is also possible to reduce any risk of contamination by the tap water or the wastewater.

The second and the third enclosure, and thus the storage of the suction hose or the tap water hose and the storage of the freshwater hose, may be provided on one side of the waste disposal station or on different sides of the waste disposal station. By "spatially" separating the enclosures and arranging them on different sides of the waste disposal station, it is possible to further reduce the risk of contaminating the freshwater hose and the freshwater.

The tap water hose preferably has a fourth coupling element, and the freshwater hose preferably has a fifth coupling element. The fourth coupling element is designed in such a way that the tap water tank on the vehicle and/or the flushing unit, where applicable, have a matching coupling element. Analogously thereto, the fifth coupling element is designed in such a way that the freshwater tank on the vehicle has a matching coupling element. By designing the elements in this way, it is possible to connect the hoses releasably and thus for the respective hose to be used in a versatile manner.

In one particularly preferred embodiment, the first coupling element of the suction hose, the fourth coupling element of the tap water hose, where applicable, and the fifth coupling element of the freshwater hose, where applicable, are different in design. This embodiment has the advantage that it is possible to prevent the freshwater hose, the tap water hose, and the suction hose from being confused with each other, because it is not possible to connect the wrong one by mistake, due to the differently designed coupling elements.

It is particularly preferred when the freshwater hose, the tap water hose, and the suction hose each have a shutoff device before the respective coupling element. This design allows the hoses to be stored in a closed state when non-operational, so nothing can enter the hoses from the outside and no residues can escape from the hoses to the outside. A GEKA coupling in combination with a ball valve or some other coupling that is permitted for drinking water, in particular an ABA plug-in valve coupling, can preferably be used for the freshwater hose, a Gardena coupling can be used for the tap water hose, and a camlock coupling for the suction hose.

One, two, or three units are preferably provided for storing the suction hose, and, where relevant, the tap water hose, and, where relevant, the freshwater hose, in a non-operational position and for retrieving it/them to the non-operational position. The suction hose, the tap water hose, and the freshwater hose may preferably be 5 m long and ensure a working radius of at least 3 m and at most 5 m. According to this embodiment, the suction hose, the tap water hose, and the freshwater hose are arranged in the respective units for storage and retrieval when they are not being used. These units preferably have a mechanism for retrieving these hoses. The unit may include a weight, for example, which acts on the respective hose and pulls it into the unit. A cable-guided thread is one conceivable design. It is also conceivable to use a balancer, which can be specifically designed as a snap-on balancer. As an alternative thereto, the unit may also be designed as a coiler with a spring mechanism. The spring mechanism is designed in such a way that it turns the coiler, thus winding the hose onto the coiler inside the unit. Such coilers allow excellent control of the hoses and are latchable. This ensures that they are very easy to operate.

It is further preferred that the suction hose and/or the tap water hose and/or the freshwater hose can be removed from the waste disposal station substantially between chest level and head level, in particular, at a height between 1 m and 2 m, particularly preferably between 1.25 m and 1.38 m. This allows the heavy suction hose to be removed easily, without having to use the pull-out forces of the coiler. Furthermore, any residual amount of gray water and/or black water which has not been sucked out will remain in the lower loop of the suction hose and cannot drip out of the suction hose onto the tire contact area of the vehicle or into the interior of the console.

It is further preferred that the second enclosure, where relevant, is covered with a first flap, and that the third enclosure, where relevant, is covered with a second flap. As a result of this design, the suction hose and the tap water hose are located in separate enclosures, separated from the freshwater hose, and behind separate flaps. In this way, it is possible to reduce still further the risk contamination of the freshwater hose and thus the freshwater becoming contaminated.

According to another preferred embodiment, the suction port is covered with a third flap, which can be moved, in particular swiveled, from a closed position, in which the suction port is covered, into an open position, wherein at least sections of the waste disposal unit are received in the first enclosure both in the closed position and in the open position. The third flap may preferably be provided on or attached to the waste disposal station itself, and can allow the suction port to be covered when the waste disposal unit is in the parked position.

It is particularly preferred that the waste disposal unit can be equipped with the first flap, the second flap and the third flap, in order to cover all the enclosures and/or openings of the waste disposal station in the non-operating position. This design obviates the need for any kind of garage or roof cover for the waste disposal station.

It is further preferred that the first flap, where relevant, the second flap, where relevant, and/or the third flap, where relevant, are locked by locking bolts that can be actuated electrically or mechanically, and, where relevant, the first flap and the second flap are reciprocally locked. In addition, it is also preferable that the third flap and the second flap can be reciprocally locked. This design allows the second flap, which covers the third enclosure including the freshwater hose, to be unlocked only if the first flap, which covers the second enclosure including the tap water hose and the suction hose, is closed, or if the third flap, which covers the suction port of the waste disposal unit, is closed. In this way, the freshwater hose cannot be brought out of the storage position and into the supply position or the operating position until the supplying of tap water and/or the extraction process have been completed.

It is preferable that the supplying of tap water and the extraction process can be carried out simultaneously. This design is advantageous particularly when the tap water hose is used as a flushing unit and, for example, flushes the collecting basin during the extraction process, preferably continuously, in order to prevent odors. When the extraction process has been completed, the at-least-partly-flushed collecting basin can thus be pushed into the first enclosure.

In another preferred embodiment, the housing of the waste disposal unit has maintenance flaps that allow access to an interior of the waste disposal unit and which also allow an element of the waste disposal unit to be serviced, repaired, or replaced. Such maintenance flaps may be provided on all sides or on parts of one side of the housing. Maintenance flaps having a particular width are preferably provided on the side of the housing at a height which corresponds to the height and width of at least one important element of the waste disposal station, so as to allow access to this at least one important element.

According one advantageous embodiment, the waste disposal station further comprises a control unit that is preferably in signal communication with a user interface and configured to start and/or to stop an extraction process and/or, where relevant, to start and/or to stop a supply of tap water and/or a supply of freshwater, where relevant. It is preferable that the control unit can be updated and has sufficient storage for any major updates, for storing data, for providing other services which are dependent on software, or for similar purposes.

The locking bolts of the first, second, and/or third flaps can preferably be actuated electrically, and the control unit is preferably in signal communication with the first, the second, and the third flaps and designed to unlock the first and the third or the second flaps simultaneously.

The user interface is preferably designed as a control panel and is provided above a removal point for the suction hose, the tap water hose, and the freshwater hose. By means of the signal communication with the control unit, such a control panel can start and/or stop the extraction process, the supply of tap water, and the supply of freshwater, preferably by pressing a button.

The control panel can preferably be designed as a display or a touchscreen with data input for interacting with the operator. Instructions for use, or prompts for the operator, as well as advertising, messages, entertainment, etc. can be displayed on such a display or touchscreen, depending on a selected function to be performed. The instructions for use or the prompts for the operator can be set up in such a way that a next step is always shown on the display in the form of a graphic or in text form. The control unit can be designed to detect when a step is carried out and in this way to arrange for the next step to be displayed. Alternatively, the prompts for the operator or the instructions for use may also be provided acoustically. The type of instructions for use or prompts for the operator, and whether such assistance is desired, can be selected at the beginning. For example, to detect the step, suitable sensors can preferably be attached to the respective elements of the waste disposal station, said sensors being coupled in signal communication with the control unit. Such a design allows the waste disposal station to be used without external personnel.

In one preferred embodiment, the suction hose may be transparent so that the operator can see when there is no longer any gray water and/or black water being transported, and the suction unit can be switched off. An alternative embodiment may have a sensor that is purposely designed to detect when gray water and/or black water is no longer being transported. Yet another alternative may be designed in such a way that the suction unit switches off automatically after a time that can be pre-programmed using the control unit, preferably after a pre-programmed time lasting 10 to 20 minutes at most. These variants can ensure that the suction unit switches off early enough, so as to prevent the feed pump from running dry.

According to another preferred embodiment, a way of paying may be provided, preferably above the removal point for the suction hose, the tap water hose, and/or the freshwater hose. Payment can be effected using coins, tokens, bank notes, credit cards or fleet cards, or by using a mobile telephone. The payment facility can be coupled in signal communication with the control unit. In this way, it is possible to release the waste disposal station or certain components of the waste disposal station that are needed for a paid function. The payment facility is preferably coupled in signal communication with the feed pump, such that the feed pump cannot be activated until a particular amount has been paid. Alternatively, it is conceivable for the waste disposal station to be released in a simple manner, analogously to a gas pump in a gas station. It can be monitored by a camera mounted close to the waste disposal station, and payment can be made at a check-out, for example inside an associated gas station.

In one preferred embodiment of the waste disposal station, the control unit can be coupled in signal communication with the payment facility and the flaps. In a first step, the desired function of the waste disposal station can be selected using the control panel, which is preferably provided in the form of a display in this development of the invention. The display may be designed in such a way that a particular amount of money for the selected function can be displayed. In a second step, the amount can be made payable using a payment facility in the form of a bank note slit and/or a coin slot provided directly on the waste disposal station. By paying the displayed amount and selecting the function, it is possible to unlock the flap or flaps of those components of the waste disposal station which are needed to carry out the selected function. The function can preferably be released for a particular duration or for a particular flow volume. The payment facility can be designed in such a way that all the common card types can be accepted and used to pay, in particular ec, Visa, DKV, customer cards, and similar. The waste disposal station may preferably be integrated in a POS system. Monthly invoices, a kind of flatrate, and/or fleet management are other options to be offered. In the case of payment in cash, it is particularly preferred that a safe that can receive cash and provide change is provided inside the waste disposal station. Such a safe can be emptied and stocked on a daily basis.

It is preferred that the payment facility is based on a radio technology, in particular, on near field communication (NFC) technology. In this way, it is possible by means of a smartphone equipped with an NFC chip and an appropriate payment app, to perform a payment transaction using NFC. The waste disposal station is equipped in this regard with a suitable NFC reader (scanner) and allows a particular amount to be paid by activating the app and the radio communication link, which requires physical proximity of the smartphone to the NFC reader, preferably a distance less than 10 cm.

In one preferred development of the invention, the vehicle may be provided with a transponder with an NFC chip or an NFC sticker and the waste disposal station with an NFC reader. The transponder can provide data relating to the vehicle. The NFC reader must be attached to the waste disposal station in such a way that it can be brought into physical proximity to the transponder of the vehicle. Due to the many different types and sizes of vehicle, it is particularly preferred that the NFC reader is adjustable in height. As an alternative to payment using a smartphone, an Internet terminal may also be provided.

In one alternative embodiment, an app for a smartphone or a single transponder may be provided that combines the aforementioned contactless payment and the aforementioned vehicle identification. With this configuration, it is possible to select a desired function of the waste disposal station and by means of the aforementioned radio communication link to pay the amount for that function and to transmit information about the vehicle.

A source of sound may preferably be provided that is coupled in signal communication with the control unit. The control unit may be configured to provide an acoustic signal indicating that one of the flaps has been released, that the operating state has started, and/or that the operating state has ended. As an alternative thereto, the release of one of the flaps, the start of the operating state, and/or the end of the operating state can be indicated on the display.

In another conceivable embodiment, the feed pump cannot be started until the coupling element of the suction hose is connected either to the suction coupling of the wastewater tank or to the suction port of the waste disposal unit. With this embodiment, it is possible to prevent the operator from positioning the waste disposal unit only, for example, but forgetting to connect the suction hose to the suction port. In such a case, the collecting basin of the waste disposal unit would overflow when its capacity has been reached. With this embodiment, an appropriate sensor which recognizes that the suction hose is no longer attached to the waste disposal station, but has been brought into the operating position, would have to be attached to the coupling element of the suction hose.

The waste disposal station according to the invention may also be developed such that it has at least one more appropriate sensor, which is coupled in signal communication with the control unit and is configured to signal errors and/or malfunctions of the waste disposal station. In this variant, the control unit may be in signal communication with the control panel, which is preferably provided in the form of a display, so that the respective errors and/or malfunctions are displayed on the control panel. A conceivable alternative is that the errors and/or malfunctions are signaled in the form of an acoustic signal.

In a preferred development of the invention, the waste disposal station according to the invention may have at least one more appropriate sensor, which recognizes when the suction hose and/or the freshwater hose and/or the tap water hose has been removed, and which signals this via a signal communication link to the control unit. It is preferable that the sensors can also detect when the suction hose and/or the freshwater hose and/or the tap water hose are received in the respective receiving units. It is particularly preferred that the respective flaps can be locked by detecting when the suction hose and/or the freshwater hose and/or the tap water hose have been received in the respective receiving units, preferably after a time which is pre-programmed using the control unit. The pre-programmed time is to be set such that an operator has time to take his or her hand out of the enclosure.

It is particularly preferred that another sensor designed to detect a specific filling capacity of the wastewater collection tank can be provided at the wastewater collecting tank. By means of a signal communication link to the control unit, a signal detected by the sensor can then be displayed or signaled in the form of the acoustic signal. A conceivable alternative is that the sensor is coupled in signal communication with an emptying device that is designed to empty the wastewater collecting tank, preferably into the sewer system, in response to the detected signal.

A signal from the sensor(s) can preferably be transmitted wirelessly to avoid the need for cables. It is particularly preferred that data can be transmitted via a short-range modem, an analog modem, a GSM modem, or an ISDN terminal adapter.

In another preferred embodiment, the waste disposal station includes a vehicle identification unit for detecting a vehicle identification code, the vehicle identification unit being in signal communication with the control unit and with an electronic data store and being configured to determine a positioning parameter from the vehicle identification code for any vehicle identification code identified by means of the vehicle identification unit. Individual positioning parameters for any vehicle identification code identified by means of the vehicle identification unit can be stored in the electronic data store.

According to another preferred embodiment, the waste disposal station also includes a distance measuring unit. The control unit is configured in this regard to assign, in a configuration mode, a distance measured by means of the distance measuring unit to a vehicle identification code detected by means of the vehicle identification unit, and to store in the data store said distance and its assignment to said vehicle identification code.

Due to the control unit being coupled in signal communication with the user interface and the distance measuring unit, it is adapted to control the user interface according to the measured distance and the individual positioning parameter. According to this embodiment, the vehicle is correctly positioned with the aid of a positioning parameter. This positioning parameter is stored in an electronic data store and is assigned to a vehicle identification code which is likewise stored therein.

The positioning parameter can be, for example, a distance between the area of the vehicle detected by the distance measuring unit, for example, the front area of the vehicle, and the drainage port of the wastewater tank of the vehicle. The positioning parameter can be read from the data store after the vehicle identification code has been detected by means of a suitable vehicle identification unit. This can be done, for example, by reading out a transponder (NFC, Bluetooth, RFID, or the like), which is attached to the vehicle or to a keyring, by using a suitable receiver disposed on the waste disposal unit so that the vehicle is clearly identified in this manner by means of a vehicle identification code stored in the transponder.

The vehicle identification code may already include a positioning parameter, which is applied accordingly by appropriate software in the control unit and which is also understood as a stored positioning parameter within the meaning of the invention. In this case, the control unit stores a matching software code which derives a corresponding positioning parameter from the retrieved vehicle identification code.

A tabular assignment of vehicle identification codes and positioning parameters can also be stored in the control unit, however, and the associated positioning parameter can be retrieved from the table on the basis of a retrieved vehicle identification code, and used for positioning the vehicle.

The vehicle can also be identified in a different way, for example, by detecting the vehicle registration number and processing that vehicle registration number as a vehicle identification code.

Due to the positioning parameter being retrieved in this manner, it is possible to determine with precision the position, relative to the waste disposal unit or relative to a reference point of the distance measuring unit, of the vehicle surface measured using the distance measuring unit, and in this way to place the drainage port of the wastewater tank of the vehicle precisely and reproducibly above the basin opening.

It should be understood, in particular, that the control unit can also take the form of an electronic circuit arranged adjacent the collecting basin, on the one hand, and an electronic data store provided in a central location at a distance therefrom. Such an electronic data store provided centrally at some other location may be connected, for example, by suitable data links, to the electronic circuit of the control unit. More particularly, such an electronic data store may be connected to a plurality of electronic circuits which are assigned accordingly to a plurality of collecting basins and their positioning devices. It is advantageous, for example, when positioning parameters and vehicle identification codes are stored centrally on a server in an electronic data store and are accessible from a plurality of positioning devices arranged decentrally in relation thereto, so that they can be downloaded to allow correct positioning of a vehicle at several different locations by means of respective positioning devices.

According to another preferred embodiment, the control unit is configured to assign, in a configuration mode, a distance measured by means of the distance measuring unit to a vehicle identification code detected by means of the vehicle identification unit, and to store in the data store said distance and its assignment to said vehicle identification code. According to this embodiment, the control unit may be programmed in a configuration mode, with a vehicle being stored with a specifically detected positioning parameter. To that end, the vehicle which previously could not be correctly positioned with the aid of the positioning device is positioned in such a way that the drainage port of the wastewater tank of the vehicle is above the basin opening, and a positioning parameter is then derived from this position of the vehicle on the basis of the distance measured by the distance measuring unit, assigned to the vehicle identification code, and stored accordingly in the electronic data store. This allows vehicles and their matching positioning parameters to be registered in a procedure similar to a teach-in, thus allowing a database for different vehicles to be created easily and quickly for subsequent use by the waste disposal unit according to the invention.

It is further preferred that the waste disposal station can be mounted on a mounting frame concreted into the tire contact area of the vehicle and is adapted for connection to a supply line for freshwater and/or tap water and to a wastewater disposal line inside the mounting frame. The mounting frame may have at least one hole for piping and at least one further hole for attachment. This kind of mounting frame is used as a jig for pipes and cables laid frost-free and coming from the tire contact area of the vehicle. In this embodiment, the waste disposal station comprises at least one stationary unit, wherein the feed pump, in particular, the rotary lobe pump, is fixed to the stationary unit and is connected via the suction hose to the suction coupling of the vehicle wastewater tank or to the suction port of the waste disposal unit. The wastewater collecting tank for receiving the fluid may be stationary or mobile in design and be connected to the sewer system so that it is not necessary to empty or replace the wastewater collection tank. The wastewater collecting tank can be provided, particularly preferably, with direct access to the sewer system so that it can be automatically emptied. The piping is preferably provided in the ground and thus underneath and in the tire contact area, such that damage caused by inadvertently stepping on the piping can be prevented. As an alternative to a pipe, a flexible tube can also be provided, which reduces the risk of damage. When connected to the sewer system, the volume of fluid from the vehicle wastewater tank can be as large as necessary, because the fluid can be channeled directly into the sewer system.

The waste disposal station according to the invention can thus be designed in such a way that neither the supply of freshwater nor the supply of tap water are integrated. The waste disposal station can still have either the supply of freshwater or the supply of tap water.

It is preferred, finally, that the suction hose is guided around a reverse roller that is rotatably mounted on an axle, the axle being mounted translationally movably along a guideway and capable of being moved from a retracted position of the suction hose along the guideway into a pulled-out position of the suction hose.

It is preferable that the guideway extends with a vertical directional component and the reverse roller is arranged in the retracted position of the suction hose above a position of the reverse roller in the pulled-out position of the suction hose.

It is particularly preferred when the waste disposal station has at least one camera for recording an area above the collecting basin and a display device configured to display what is recorded by the camera to a user.

In the case of a mobile collecting basin, i.e., a positionable collecting basin, the camera is preferably mounted on the waste disposal unit. It may also be preferred that the camera is accommodated inside the collecting basin or inside the tire contact area.

This embodiment is based on the realization that it is necessary to position the collecting basin as precisely as possible under the drainage opening of the vehicle, in order to prevent any adverse effects as efficiently as possible, such as splashes or the spreading of odors. Such precise positioning is difficult, because the drainage opening is located underneath the vehicle and because a user must keep the area underneath the vehicle constantly in view during positioning, as a result of which the user may be exposed to additional unpleasantness.

The aforementioned embodiment solves this problem by providing the user with at least one camera and a respective display device. The camera is set up in such a way that it records an area above the collecting basin. This area is then displayed to the user as a camera recording on the display device, such as an LCD screen. This display device may also be designed simultaneously as a user interface.

The "area above the collecting basin" describes an area over the collecting basin, but the collecting basin does not have to be discernible within that area. In the case of a mobile collecting basin, which is also adjustable in height, it is possible, for example, that the collecting basin in a lowered position is not inside the area scanned by the camera and that it does not enter that area until it is raised. In the event of the collecting basin being positioned underneath the drainage opening, this allows the drainage opening to be discernible in the area scanned by the camera.

If the collecting basin is not moved by the positioning device into the area under the drainage opening, the user can discern the drainage opening on the display device. This enables the user to determine on the basis of the image transmitted from the camera whether the collecting basin is already well-aligned or whether further corrections need to be made to its position. It is also advantageous that the user can keep his vision fixed on the display device when changing the position, and does not have to interrupt the positioning procedure in order to check the position at regular intervals. This reduces inconvenience for the user, firstly, and secondly, it allows the collecting basin to be positioned more quickly, not only in the horizontal direction by moving it, but also in the vertical direction by adjusting its height.

Alternatively or additionally thereto, and according to a further embodiment, the waste disposal unit includes a mirror unit.

In the case of a mobile collecting basin, such a mirror unit can be arranged on the positioning device. By using the mirror, the operator is able to watch the underside of the vehicle while operating the waste disposal unit by means of the handle. In this way, the operator can look for the drainage opening of the vehicle on its underside without much effort and can align the waste disposal unit as precisely as possible. It is preferred that the mirror unit has markings which the operator can use for orientation when positioning the waste disposal unit. Markings in the form of a ring or crosshairs are particularly advantageous.

In another preferred embodiment, the waste disposal unit includes lighting equipment. It is advantageous to equip the waste disposal unit with lighting equipment which firstly provides sufficient lighting for the operator in the event of night-time operation, but which also ensures, secondly, that there is sufficient lighting for positioning. In this regard, the lighting equipment may comprise one or more lighting elements arranged at different points on the waste disposal unit or also on the waste disposal station.

It is preferred, in particular, that lighting is provided for the operating elements for the waste disposal station. It is also advantageous to illuminate the mirror unit in such a way that the driver of the vehicle can also carry out positioning in the dark. The lighting can be activated by means of a motion detector.

It is also advantageous to equip the waste disposal station and, in particular, the waste disposal unit with lighting for a camera and/or to equip the camera itself with a lighting element. This allows the area above the collecting basin to be scanned by the camera and to produce a clear picture even in poor lighting conditions underneath the vehicle. More particularly, such lighting equipment allows pictures of good quality and with easily recognized details to be shown on the display device even in poor weather conditions or at night.

In one preferred development of the invention, a central data capturing device may be provided that is in signal communication with the control unit and adapted to detect and to monitor one or more or all the functions of the waste disposal station. Any error messages and/or alarms that arise can also be viewed and managed. It is particularly preferred that data from the central data capturing device can be viewed using a mobile user interface, access to which may be password protected.

Data are preferably transmitted wirelessly from the control unit to the central data capturing device. It is particularly preferred that data are transmitted by means of a short-range modem, an analog modem, a GSM modem, or an ISDN terminal adapter.

The central data capturing device may be configured to provide all operating information. It is possible, for example, to view the water consumption, the operating hours of the rotary lobe pump, and, where relevant, the operating hours of the submersible pump. Captured data can also be used for dry-run protection of the pump and for motor protection of the rotary lobe pump. In addition to the data, a defined time stamp and the temperature curve of the waste disposal station can also be recorded. Data indicating the service time of the suction unit and also of the positionable waste disposal unit can preferably be recorded and analyzed. In addition to the operating data, the central data capturing device may also be configured to transmit any alarms and to display them at the mobile user interface. Such alarms may be caused by technical or also by non-technical factors, which can be separately displayed. The captured operational data and/or the alarms may be used for statistical purposes and/or for analyses. Data relating to filled and extracted volumes, and to the time taken for filling and extraction, and the time at which filling and extraction operations are conducted, can be additionally captured and stored.

Finally, an emergency power supply that safeguards a supply of power even in the event of a power failure is also preferred. It is particularly preferred that the emergency power supply provides current for the feed pump. This ensures that in the event of a power failure during the extraction process, any wastewater in the suction hose or in the waste disposal unit is extracted.

The emergency power supply can also be used to ensure that if payment is made by card, the card is also returned.

The aforementioned embodiments of the invention are based on the idea of collecting so much information about the vehicle itself and about its extraction and filling operations, and, in particular, of producing statistics or other analyses by means of the data. Such data can track water consumption and operating hours of the feed pump or, where relevant, of the submersible pump, and can ensure dry-run protection of the pump and motor protection of the feed pump. The data can preferably be marked with a time stamp that is stored preferably in the control unit. In this way, a specific time can be associated with events such as an extraction process, a filling operation, an extracted volume, a filling volume, and any error messages. With this information about a vehicle, it is possible to trace at which time the vehicle is in which location. It is also possible to record and analyze when and how often the waste disposal unit is used, or when and how often the suction hose is used directly for an extraction process.

In one preferred embodiment, data relating to temperature variation inside the housing can be used to prompt maintenance work. Reference values are stored for this purpose in the control unit. As an alternative thereto, maintenance can also be triggered after a specific, measured service time or after a defined period has elapsed.

Finally, it is further preferred that waste disposal station according to the invention is linked to a vehicle diagnosis system, in particular, to a vehicle's on-board diagnostics system. The vehicle diagnosis system according to the invention is a software that is designed to register and monitor emissions-related systems and other important control units in a vehicle. For example, any errors that occur can be displayed to a vehicle driver by means of a warning light and stored in the respective control unit. By recording errors in this way, it is then possible for them to be retrieved later by a service center using standardized interfaces. Alternatively, such errors and other data, in particular, the data mentioned below, can also be communicated to the operator him- or herself, preferably by email.

The vehicle diagnosis system may include an acceleration sensor which can register and analyze a driving style by means of acceleration data. The braking and accelerating behavior of a vehicle driver can be recorded. A CPU chip for controlling processes, a GPS/GSM module for locating a vehicle and for connecting to a cloud, a flash memory for storing trips, a SIM card for identification in the data link, and/or an internal battery as a back-up power supply in case the power supply is interrupted by the vehicle, may be integrated in the vehicle diagnosis system.

Another aspect of the invention is a vehicle diagnosis system having an OBD2 plug for connecting the vehicle diagnosis system according to the invention, comprising an acceleration sensor for registering and analyzing a vehicle's acceleration and braking, a CPU chip for controlling a process, a GPS/GSM module for locating the vehicle and for connecting to a cloud, a flash memory for storing data, a SIM card for identification in a data link, and an internal battery. The vehicle diagnosis system includes a customer card function in the form of Tanktalers or bonuses and/or a payment system, and is designed to calculate a time and/or a place for disposal and/or when it is necessary to fill and/or evacuate tanks, where relevant. Such a function is supplementary to a conventional logbook. By storing the data relating to an extraction process and/or a filling operation, it is possible to determine an average need and thus to identify any irregularities and an undiscovered leakage.

The vehicle diagnosis system may be designed to calculate when and where the wastewater next needs to be emptied and/or when freshwater or tap water needs to be filled up. The vehicle diagnosis system may also be designed to store the locations of such waste disposal stations and to show them to the operator. It is particularly preferred that the vehicle diagnosis system can show the operator the location of a waste disposal station which the operator must drive to next, based on average needs, and a route to be driven.

Finally, it is preferred that the OBD2 plug is adapted to register data of the vehicle, such as a battery charge level, a kilometer reading, a filling level of the gasoline tank, an electronic logbook, or trip details, to which manual entries can be added and which can be read out, preferably by email.

Other elements of the vehicle diagnosis system may include a flow rate sensor in the freshwater line, a comparison of the actually-consumed amount of freshwater based on the extracted amount of wastewater with the amount of freshwater fed into the freshwater tank by a user, and signaling an atypical ratio between the amounts of supplied and consumed freshwater to display leakages or operating errors. It is also possible to calculate, based on a comparison of the flow volume and the filling level or the change in filling level in the freshwater tank of the vehicle, whether the supply of freshwater is leak-free, and to emit a signal or to interrupt the supply of freshwater if it is discovered that losses are incurred in the supply of freshwater. In the same manner, it is possible to determine, based on a comparison of the flow volume in the suction hose and the filling level or the change in filling level in the wastewater tank of the vehicle, whether the extraction of wastewater is leak-free, and to emit a signal or to interrupt the emptying process if it is discovered that losses are incurred when extracting the wastewater.

BRIEF DESCRIPTION OF THE DRAWINGS

Preferred embodiments of the invention shall now be described in further detail with reference to the attached Figures, in which:

FIG. 3 is a side view of a suction unit according to the invention, in a situation where it is connected to a wastewater tank;

FIGS. 4A-4E are five variants of the suction unit in the region of the wastewater tank, in a partly cut-away side view;

FIG. 5A is a front view of a preferred embodiment of the waste disposal station according to the invention, with the housing masked;

FIG. 5C is a front view of the waste disposal station according to the invention, as shown in FIG. 5A, with the housing shown and with flaps closed;

FIG. 6A is a side view of the right-hand side of the preferred embodiment of the waste disposal station according to the invention, with the housing masked;

FIG. 7 is a side view of the left-hand side of the preferred embodiment of the waste disposal station according to the invention, with maintenance flaps and with the waste disposal unit pulled out;

FIG. 9B is a perspective side view from front right of the preferred embodiment of the waste disposal station according to the invention;

FIG. 11A is a perspective side view from front left of the preferred embodiment of the waste disposal station according to the invention, with the housing masked;

DETAILED DESCRIPTION OF THE PREFERRED EMBODIMENTS

Figure 1:
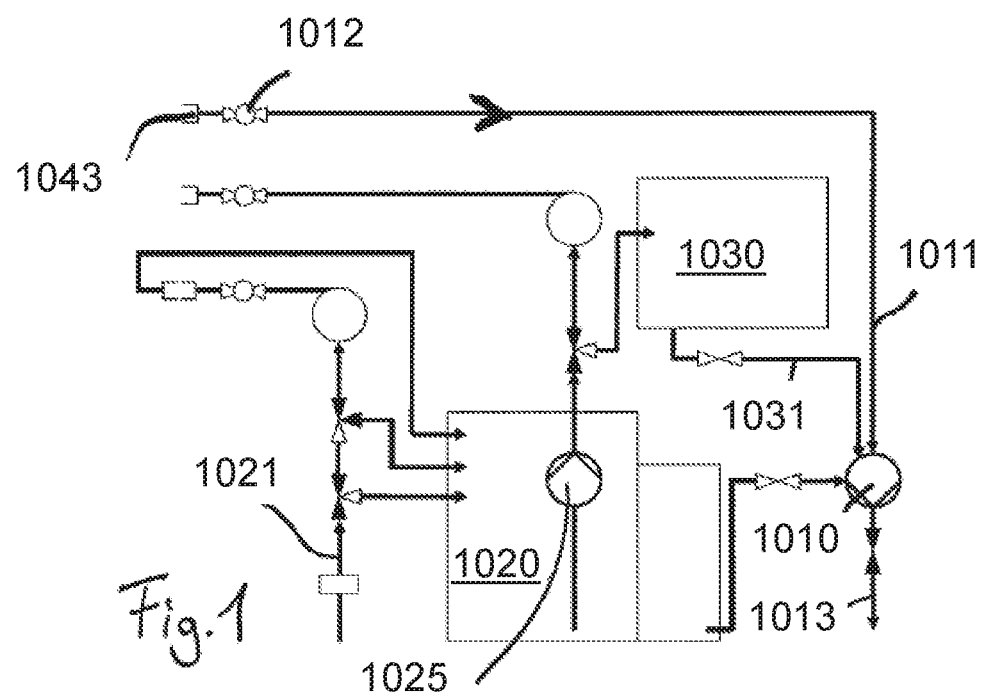
FIG. 1 is a schematic diagram of the suction unit according to the invention, in operation for an extraction process.

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Referring firstly to FIG. 1, the suction unit according to the invention includes a rotary lobe pump 1010 which is connected via a suction line 1011 to a combined suction and flushing channel 1043 installed in a wastewater tank (not shown). Suction line 1011 is connected via a bayonet coupling 1012 to a connection port that is permanently attached to the wastewater tank, thus producing a fluid-tight connection.

During extraction, the rotary lobe pump 1010 is driven in such a way that it conveys the wastewater out of the wastewater tank in extraction direction A into a wastewater line 1013.

The suction unit further comprises a system separator 1020, which is filled via a freshwater line 1021 with the pressure of the freshwater line. The system separator 1020 receives a maximum amount of freshwater, which is safeguarded via respective float switches and an overflow pipe, and does not have a direct connection to the circulation on the extraction line.

By means of a system separator pump 1025, the freshwater kept in interim storage in the freshwater tank is conveyed into a flushing tank 1030. Flushing tank 1030 is used to keep the freshwater in interim storage separately from the freshwater tank. Flushing tank 1030 is connected via a flush water line 1031 to rotary lobe pump 1010 and can supply flush water to the rotary lobe pump.

Figure 2:
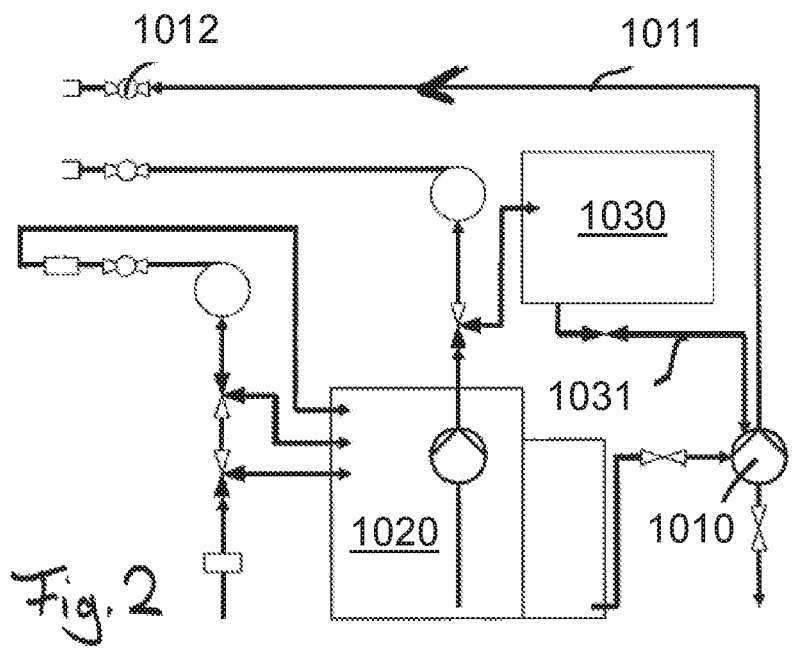
FIG. 2 is a schematic diagram of FIG. 1 in operation for a flushing process.

FIG. 2 depicts the flow of flush water during the flushing process of the suction unit according to the invention. Flush water is supplied from flush water tank 1030 via flush water line 1031 to rotary lobe pump 1010, the rotational direction of which is now reversed in relation to the direction of rotation during the extraction process in FIG. 1. The flush water is supplied under high pressure via suction line 1011 to the wastewater tank connected to connection coupling 1012 and causes solid matter in the wastewater tank to be detached and agitated. After such a flushing process has been carried out, an extraction process can then be carried out again with the switching according to FIG. 1.

FIG. 3 shows the structural design of the suction unit according to the invention. As can be seen, suction line 1011 is connected fluid-tightly to the connection coupling of wastewater tank 1050 by means of a bayonet coupling 1012. An integral suction and flushing channel 1043 extends perpendicularly from an integral suction and flush adapter 1041 into the wastewater tank 1040. The suction channel extends from the adapter 1041 inserted in the upper tank wall to just above the inner surface of the tank base and has a suction hood 1043a at its bottom end.

Suction line 1011 is diverted via a roller guide 1051 as hose holder and is connected to the rotary lobe pump 1010. The rotary lobe pump 1010 is also connected by a wastewater hose 1015 to a wastewater connection, such that during the extraction process, suction line 1011 forms the suction side of the rotary lobe pump 1010 and wastewater line 1015 forms the pressure side of rotary lobe pump 1010.

A flush water tank 1030 is connected to the rotary lobe pump 1010 via a flush water line 1031 and flush water on the suction side when the rotary lobe pump 1010 is in flushing mode. This flush water is fed into suction line 1011, which is the pressure side when the flush water is conveyed in this direction.

FIG. 4A depicts an embodiment of an integral suction and flushing channel 1043 when installed in a wastewater tank. At its bottom end, the integral suction and flushing channel 1043 has a suction hood 1043a, which is made of rubbery elastic material and has a bottom circumferential rim 1044 which has a plurality of recesses 1044a, 1044b. These recesses 1044a, 1044b allow flush water to exit the channel radially in a strong flushing jet in combination with the tank bottom opposite the extraction hole, thus allowing solids to be detached efficaciously from the bottom of the wastewater tank.

FIG. 4B shows a variant in which an integral suction and flushing channel 10143 is likewise provided in the form of a rigid pipe that ends just above the bottom of the tank and which is used both for extracting and also for flushing.

FIG. 4C shows an embodiment in which a suction channel 10243 with an obliquely cut suction port at the bottom end, and a separate flushing channel 10245 with a flushing hole arranged just above the bottom of the tank, and having a plurality of recesses 10245a, 10245b in the rim of the opening, are provided. With this variant, the extraction process and the flushing process are carried out using separate channels. More particularly, a plurality of flushing channels 10245 may be provided in order to detach deposits on the bottom of the tank efficiently in the case of large wastewater tanks.

FIG. 4D shows a variant of FIG. 4C, in which flushing channel 10345 has no recesses at its bottom rim, but instead has a plurality of openings 10345a, 10345b in the radial direction. In this variant, the flushing channel 10245 can be placed on the floor of the tank, and the radial openings are arranged just above the bottom of the tank and produce a plurality of high-pressure flushing jets which exit the flushing channel 10245 in the radial direction.

FIG. 4E shows a variant in which a suction channel 10443 with a lower, obliquely-cut suction port is likewise provided. In this variant, flushing channel 10445 is fitted at its bottom end with a self-rotating nozzle 10445a. This self-rotating nozzle 10445a may be designed in such a way that flush water flows against a flow surface and sets it in motion, which, in turn, makes the nozzle rotate about the longitudinal axis 10100 of the flushing channel 10445, thus causing one, two, or a few high-pressure flushing jets to exit the nozzles radially or radially and tangentially to longitudinal axis 10100 from the moving nozzles rotating about the longitudinal axis 10100, thus causing deposits to be efficaciously detached.

The suction unit in FIGS. 1-4E may be used, in particular, in the waste disposal station shown in FIGS. 5A-12B and described below.

FIGS. 5A-12B show a preferred embodiment of the waste disposal station according to the invention, in different views and perspectives so that all the main components of the invention are shown. In addition to the different views and perspectives, the waste disposal station according to the invention is also shown in each respective view and perspective both with and without the housing. The views with the housing shown are also provided in each case with the flaps and/or maintenance flaps closed, and with the flaps and/or maintenance flaps open. According to this preferred embodiment, all the components are arranged inside the housing. The Figures show a compact design of the preferred embodiment of the waste disposal station according to the invention, in a non-operating position in which a waste disposal unit is in a parked position, a suction hose is in a storage position, and a freshwater hose and a wastewater hose are in a storage position.

Figure 5B:
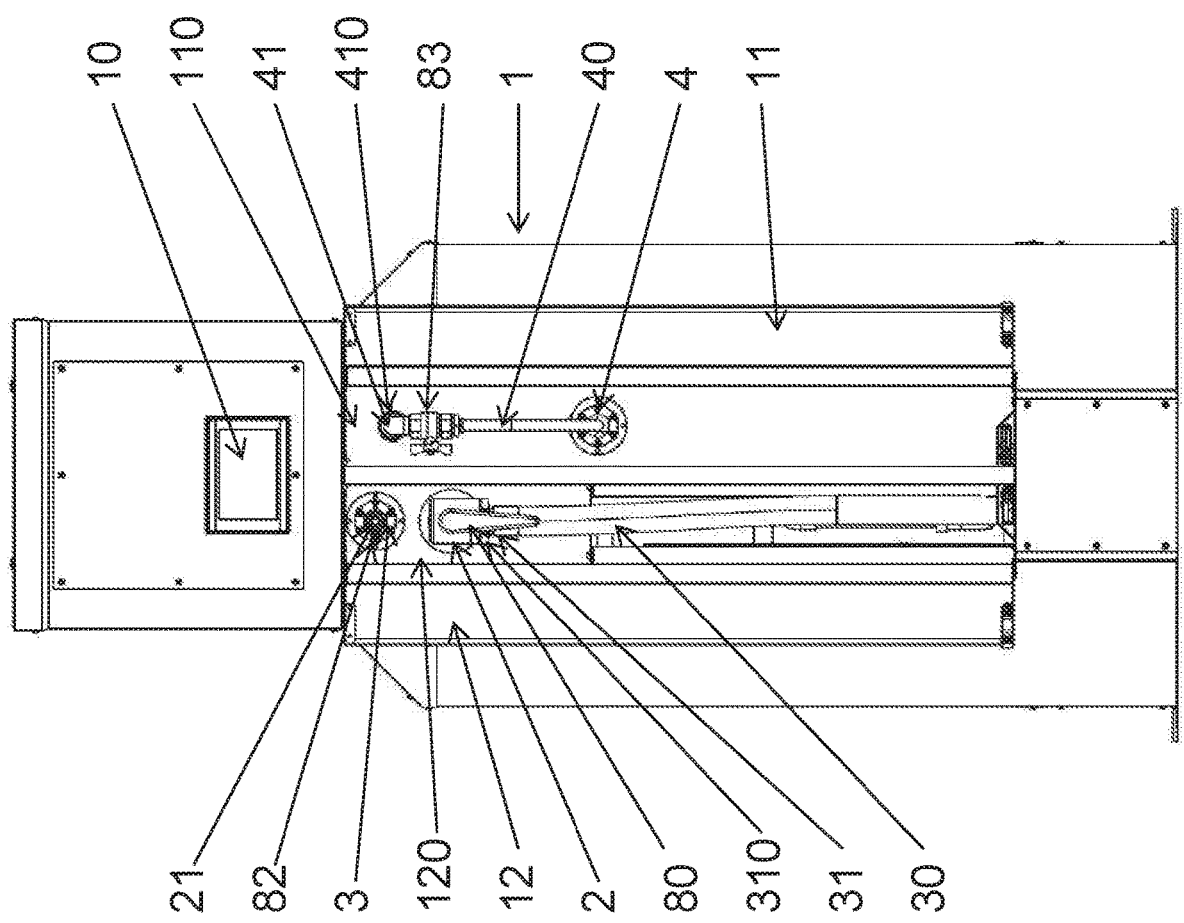
FIG. 5B is a front view of the waste disposal station according to the invention, as shown in FIG. 5A, with the housing shown and with opened flaps.

FIGS. 5A-5C show a front view of the waste disposal station according to the invention, with a control panel 10, in a view without a housing 1 (FIG. 5A), with housing 1 and with opened flaps 11, 12 (FIG. 5B), and with housing 1 and closed flaps 11, 12 (FIG. 5C), according to a preferred embodiment. Control panel 10 is provided about a removal point. The removal point contains a suction hose 30, a tap water hose 21, and a freshwater hose 40, and has two enclosures 110, 120, which can be covered by two flaps 11, 12.

In FIG. 5A, a control unit 100 is arranged spatially behind a control panel 10. The waste disposal station according to the invention includes the suction hose 30, the first end of which is connected on the inlet side to a feed pump 70 and the second end 32 of which protrudes from a first receiving opening 2 and is releasably connected via a first coupling element 31 to a corresponding first receiving unit 310. In an operating position, the first coupling element 31 may be connected either to a corresponding coupling element of a suction coupling of a vehicle wastewater tank (not shown) or to a corresponding second coupling element of an extraction hole of a positionable waste disposal unit (not shown in FIGS. 5A-5C). According to the preferred embodiment, the first coupling element 31 and the first receiving unit 310 are designed as coupling elements of a camlock coupling.

The waste disposal station also has a wastewater discharge pipe 300 that is connected to feed pump 70 and thus to wastewater hose 30, and which has a connector 301 for connecting it to a wastewater collecting tank (not shown) or to a sewer system (not shown). Due to the wastewater discharge pipe 300 being oriented in the direction of gravity, the connection to the sewer system or to the wastewater collecting tank can be provided underneath or in the lower part of the waste disposal station. In that way, extracted fluid can be disposed of easily using the force of gravity.

According to the preferred embodiment, the waste disposal station is also designed as a supply station and comprises not only a freshwater hose 40 but also a tap water hose 21.

Tap water hose 21 is guided through a second receiving opening 3 and protrudes from the latter. The second receiving opening 3 is designed in such a way that tap water hose 21 cannot slip into the interior of the waste disposal station. Tap water hose 21 has a fourth coupling element in the form of a Gardena coupling.

Freshwater hose 40 protrudes from a third receiving opening 4 and is releasably connected via a fifth coupling element 41 in the form of a GEKA coupling to a second receiving unit 410 in the form of a corresponding coupling element. A freshwater supply line 44 allows the supply of freshwater. Freshwater supply line 44 may preferably be connected to the drinking water network (not shown), to allow freshwater to be supplied using a system pressure in the drinking water network. A water meter may also be provided on the freshwater supply line 44 and indicates a volume of water that has flowed through it.

As can be seen, the first coupling element 31 (camlock coupling element), the fourth coupling element 22 (Gardena coupling element), and the fifth coupling element 41 (GEKA coupling element) and hence also the first receiving unit 310 (camlock coupling element) and the second receiving unit 410 (GEKA coupling element) are designed differently. With this design, it is possible to prevent freshwater hose 40 from inadvertently being wrongly connected and contaminated, and thus also to prevent contamination of the freshwater.

According to the embodiment, suction hose 30 has a first shutoff device 80, tap water hose 21 has a second shutoff device 81, and freshwater hose 40 has a third shutoff device 82. The third shutoff device 40 is provided in the form of a ball valve. This design allows the hoses 21, 30, and 40 to be stored in a closed state when non-operational, so nothing can enter the hoses from the outside and no residues can escape from the hoses to the outside.

FIG. 5B shows a front view of the waste disposal unit in FIG. 5A, in a housing 1 with flaps 11, 12 open. Flaps 11, 12 are a part of housing 1 and cover two, adjacently arranged enclosures 110, 120. According to the preferred embodiment, the second enclosure 120 contains a tap water hose 21 and a suction hose 30. The third enclosure 110 contains a freshwater hose 40. Freshwater hose 40, suction hose 30, and tap water hose 21 are so designed, according to the invention, that they can be removed from the respective enclosure 110, 120. With this design, it is possible for freshwater hose 40, suction hose 30, and tap water hose 21 to be pushed into the respective enclosure 110, 120, a respective coupling element 41, 31 to be connected to the respective corresponding receiving unit 410, 310, and flaps 11, 12 to be closed. In the preferred embodiment, a fourth coupling element 22 of tap water hose 21 is stored, in the non-operating position, loosely in second enclosure 120, that is, it is not connected to a corresponding receiving unit, because this supply line 21 does not have to be protected against contamination nor does it have to be closed in order to prevent odors.

Due to freshwater hose 40 being spatially separated from suction hose 30 and tap water hose 21 by the second enclosure 120 and the third enclosure 110, it is possible to lower any risk of contamination of freshwater hose 40 and thus of the freshwater. It is particularly preferred that it is not possible to open the first flap 12 of second enclosure 120 and the second flap 11 of the third enclosure simultaneously.

FIG. 5C shows the front view of the waste disposal unit in FIG. 5A, in a housing 1 with flaps 11, 12 closed. Flaps 11, 12 cover a second enclosure 120 and a third enclosure 110. The waste disposal unit according to the invention is designed substantially like a gasoline pump which is of compact design and is protected by the flaps against vandalism and weather.

Figure 6B:
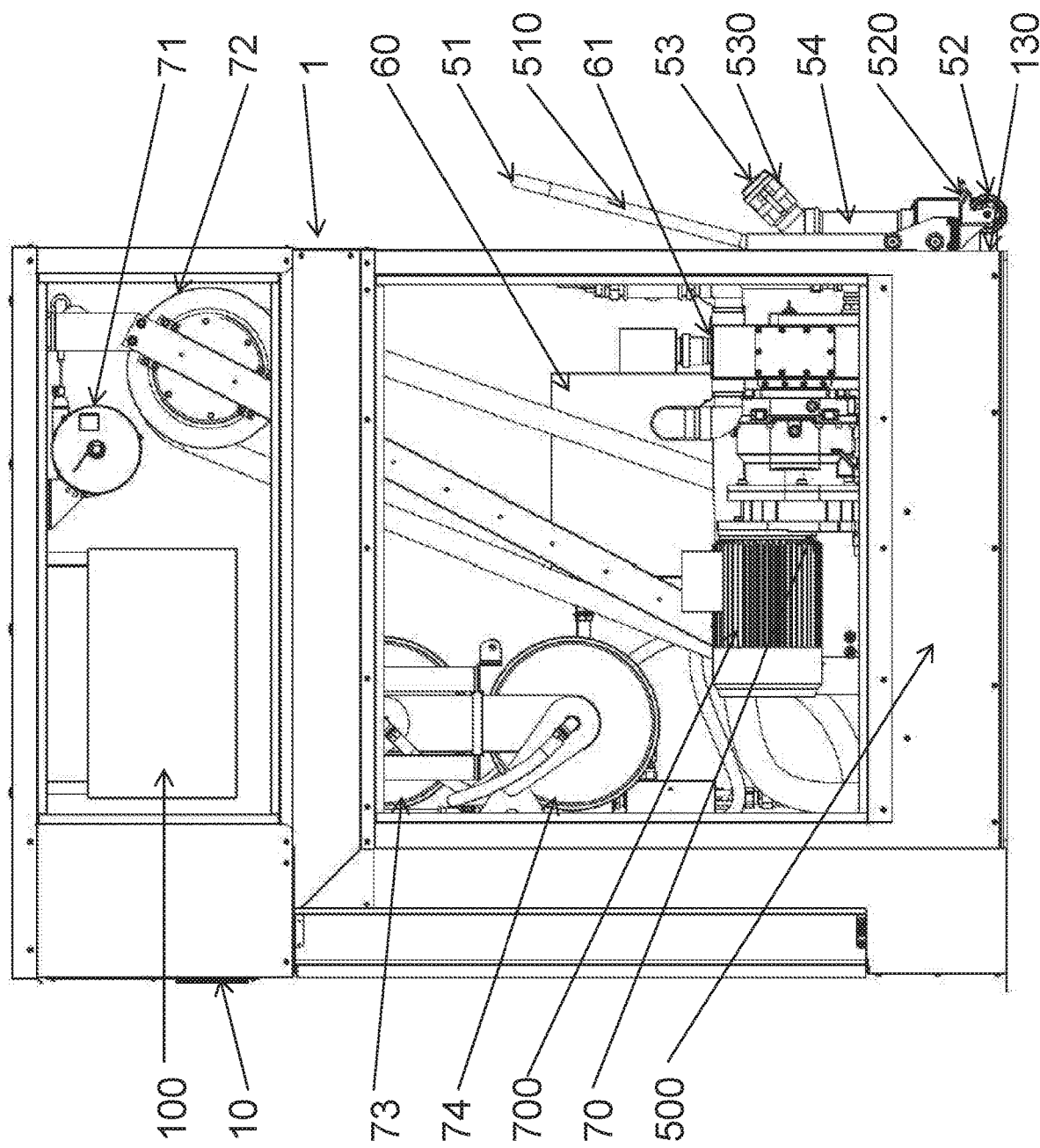
FIG. 6B is a side view of the right-hand side of the preferred embodiment of the waste disposal station according to the invention, without maintenance flaps.
Figure 6C:
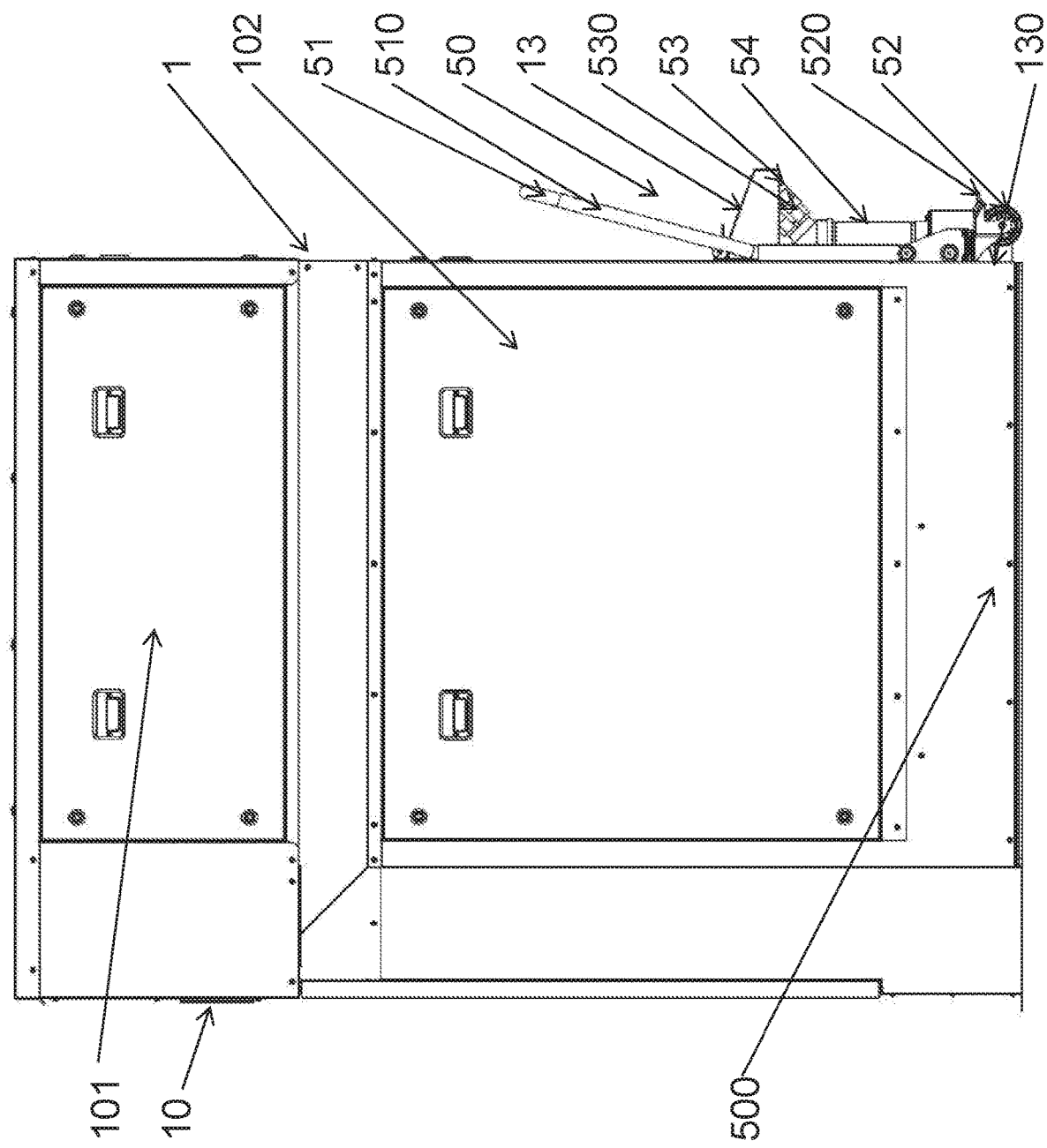
FIG. 6C is a side view of the right-hand side of the preferred embodiment of the waste disposal station according to the invention, with maintenance flaps.

FIGS. 6A-6C show a side view of the right-hand side of the preferred embodiment of the waste disposal station according to the invention, with a control panel 10 and without a housing 1 (FIG. 6A), with housing 1 but without maintenance flaps 101, 102 (FIG. 6B), or with housing 1 and maintenance flaps 101, 102 (FIG. 6C).

FIG. 6A shows the side view of the right-hand side of the waste disposal station, without housing 1. The waste disposal station according to the invention comprises a suction unit with a feed pump 70, which is driven by a motor 700 and which is connected to a first end of a suction hose 30. Feed pump 70 can be connected on the outlet side via a wastewater discharge pipe 300 to a sewer system connection or to a wastewater collecting tank (not shown). This design allows extracted gray water and/or black water to be disposed of.

Suction hose 30, freshwater hose 40, and tap water hose 21 may preferably be between 2 m and 30 m long, and particularly preferably 5 m long. FIG. 6A shows devices for keeping and returning suction hose 30, freshwater hose 40, and tap water hose 21 inside and into the waste disposal station. Both freshwater hose 40 and tap water hose 21 are arranged on coilers 73, 74. Suction hose 30 is stored inside the waste disposal station by means of a balancer 71 and a reverse roller 72.

FIGS. 6B and 6C show the design of housing 1 with and without a first maintenance flap 101 and a second maintenance flap 102. The housing 1 encloses an inner space of the waste disposal station, which contains all the components of the waste disposal station. Maintenance flaps 101, 102 allow easy access to the individual components in order to service them, repair them and/or replace them.

FIGS. 6B and 6C also show a positionable waste disposal unit 50 in a parked position. In the parked position, all the components of the waste disposal unit 50 have been inserted into a first enclosure 130. Some of the components of waste disposal unit 50 protrude from the waste disposal station. A frame 510 with a handle 51, and a caster wheel 52 with a fixing means 520, which in the preferred embodiment is designed as a total stopper for caster wheel 520, are not inserted into the waste disposal station and, therefore, are not enclosed by housing 1. The total stopper is adapted to fix the positionable waste disposal unit 50 in an operating position. Other parts which are not inserted into the waste disposal station are part of a discharge line 54, the end of which has a suction port 53 with a second coupling element 530. Suction port 53 of waste disposal unit 50 is covered in a non-operating position by a flap 13, which is provided on housing 1. The second coupling element 530 can be releasably connected, in an operating position, to a first coupling element 31 of a suction hose 30. Flap 13 is locked electromechanically.

FIG. 7 shows the preferred embodiment of the waste disposal station according to the invention, with housing 1 and closed maintenance flaps 101.1, 102.2. The housing 1 encloses an interior of the waste disposal station, which contains all the components and which is surrounded by housing 1. The freely positionable waste disposal unit 50 is also shown in a position to which it has been pushed out of first enclosure 130 of the waste disposal station. Waste disposal unit 50 is similar in design to a trolley and has a collecting basin 55 with an upper basin opening 57, a suction coupling (not shown), and a discharge line 54, the end of which surrounds the suction coupling. A second end of discharge line 54 is connected to a suction port 53. The freely positionable waste disposal unit 50 also has caster wheel 52 with a fixing means 520, a second caster wheel 52.1 and a frame 510 with a handle 51. Waste disposal unit 50 is freely movable as a result. In order to fix waste disposal unit 50 in the operating position, fixing means 520 of caster wheel 52 must be actuated so that the waste disposal unit can no longer be moved. In an operating state, the first coupling element 31 of suction hose 30 must be released from the corresponding first receiving unit 310 and brought into engagement with coupling element 530 of suction port 53.

Discharge line 54 is designed in such a way that suction port 53 faces upward and is located at approximately knee height above a height of collecting basin 55. It is possible by virtue of this design to prevent unextracted gray water and/or black water from exiting discharge line 54 after the connection between suction port 53 and suction hose 30 has been released. Instead, unextracted gray water and/or black water can flow back into discharge line 54 or into collecting basin 55.

According to the invention, collecting basin 55 has a floor which slopes downward relative to a horizontal plane. The suction coupling is provided as close as possible to the lowermost point of the floor, in order to allow optimal removal of the collected gray water and/or black water.

In the embodiment shown in the attached Figures, maintenance flaps 101, 101.1, 102, 102.1 are provided on the side of housing 1 at a height which is equal to a height of at least one important element of the waste disposal station, so as to allow access to this at least one important element. Maintenance flaps 101, 101.1, 102, 102.1 differ in size. The size of maintenance flaps 101, 101.1, 102, 102.1 are dependent on the respective elements of the waste disposal station to which maintenance flaps 101, 101.1, 102, 102.2 are meant to ensure access.

Figure 8A:
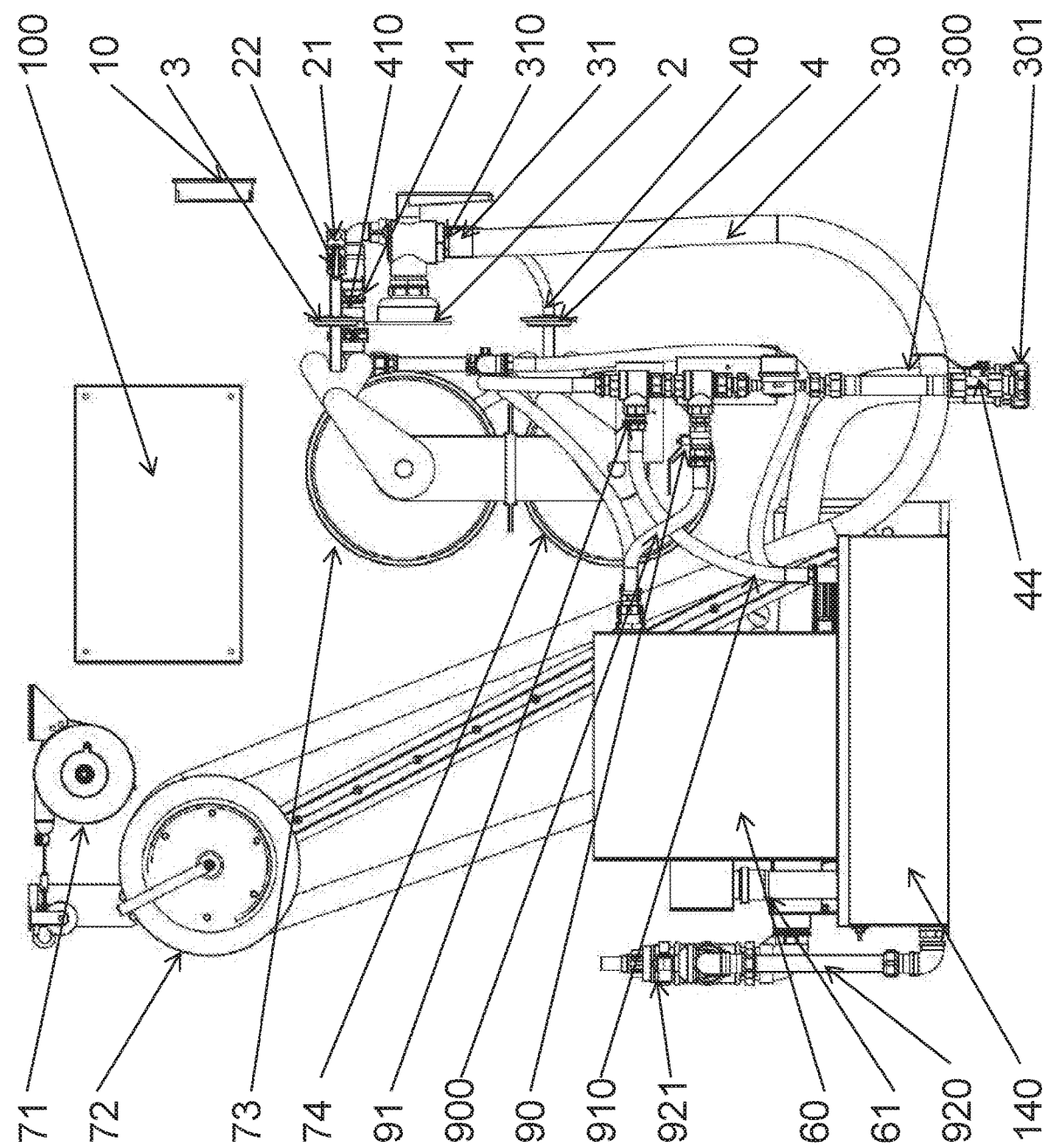
FIG. 8A is a side view of the left-hand side of the preferred embodiment of the waste disposal station according to the invention, with the housing masked.
Figure 8B:
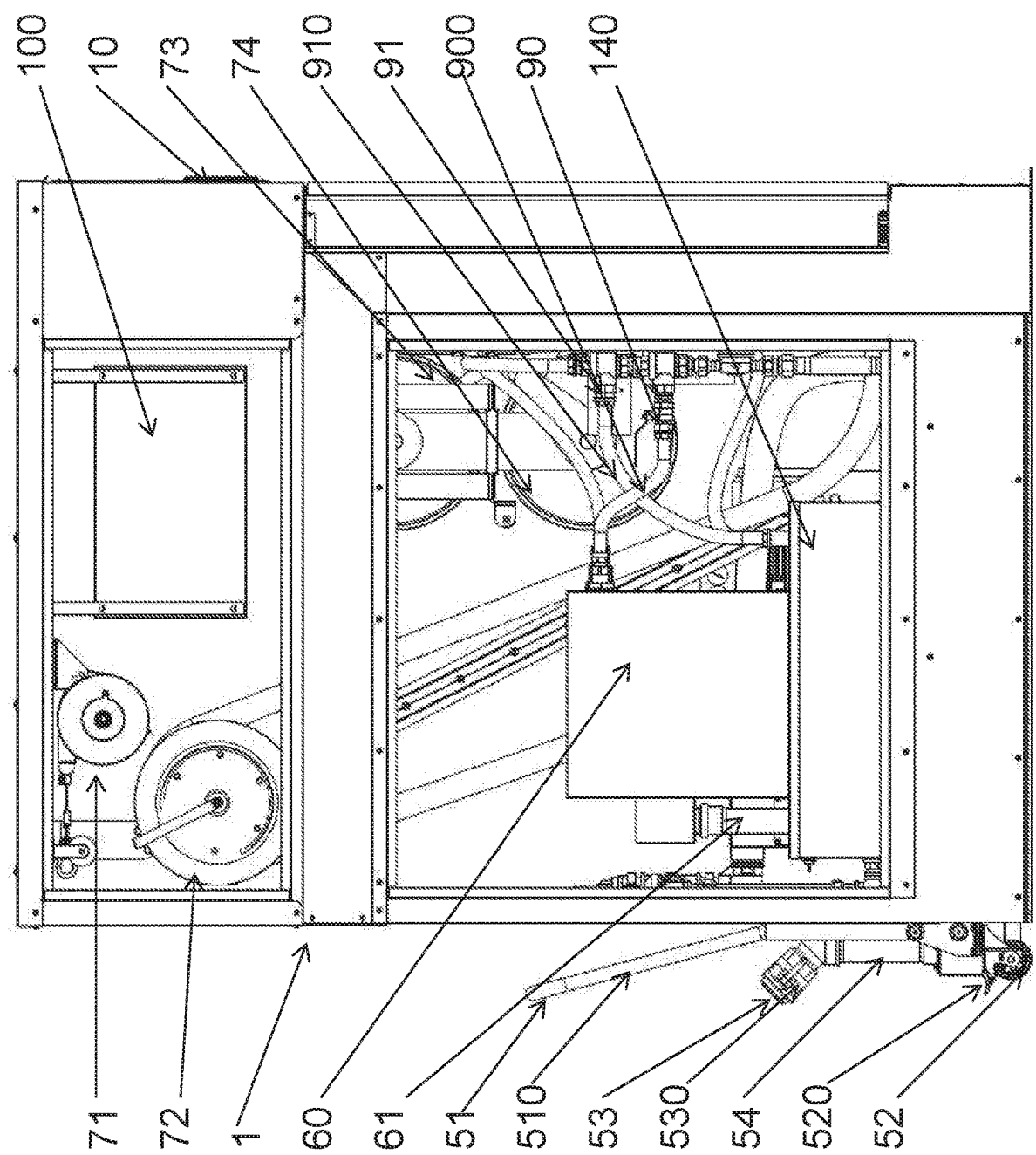
FIG. 8B is a side view of the left-hand side of the preferred embodiment of the waste disposal station according to the invention, without maintenance flaps.
Figure 9A:
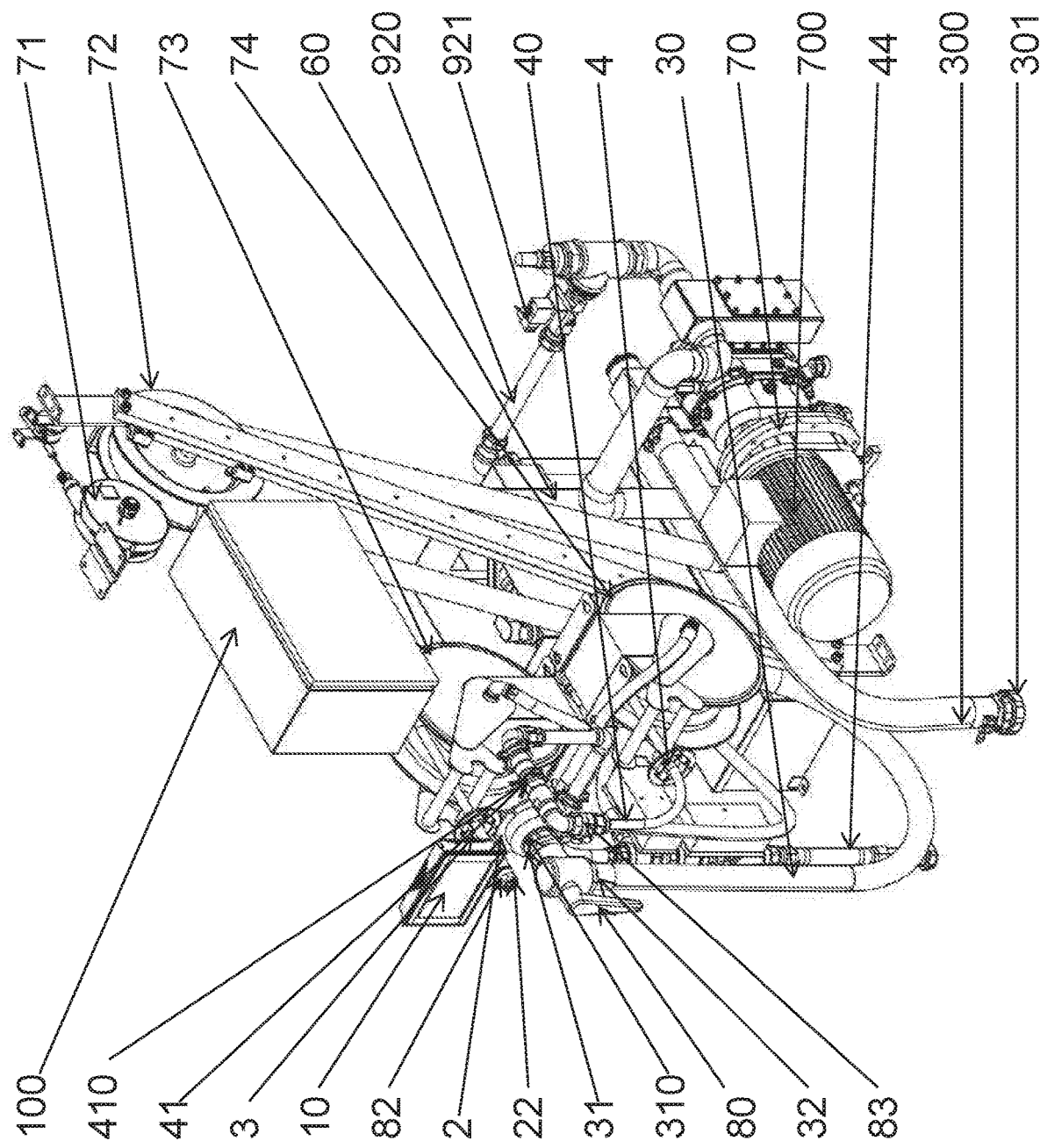
FIG. 9A is a perspective side view from front right of the preferred embodiment of the waste disposal station according to the invention, with the housing masked.
Figure 10A:
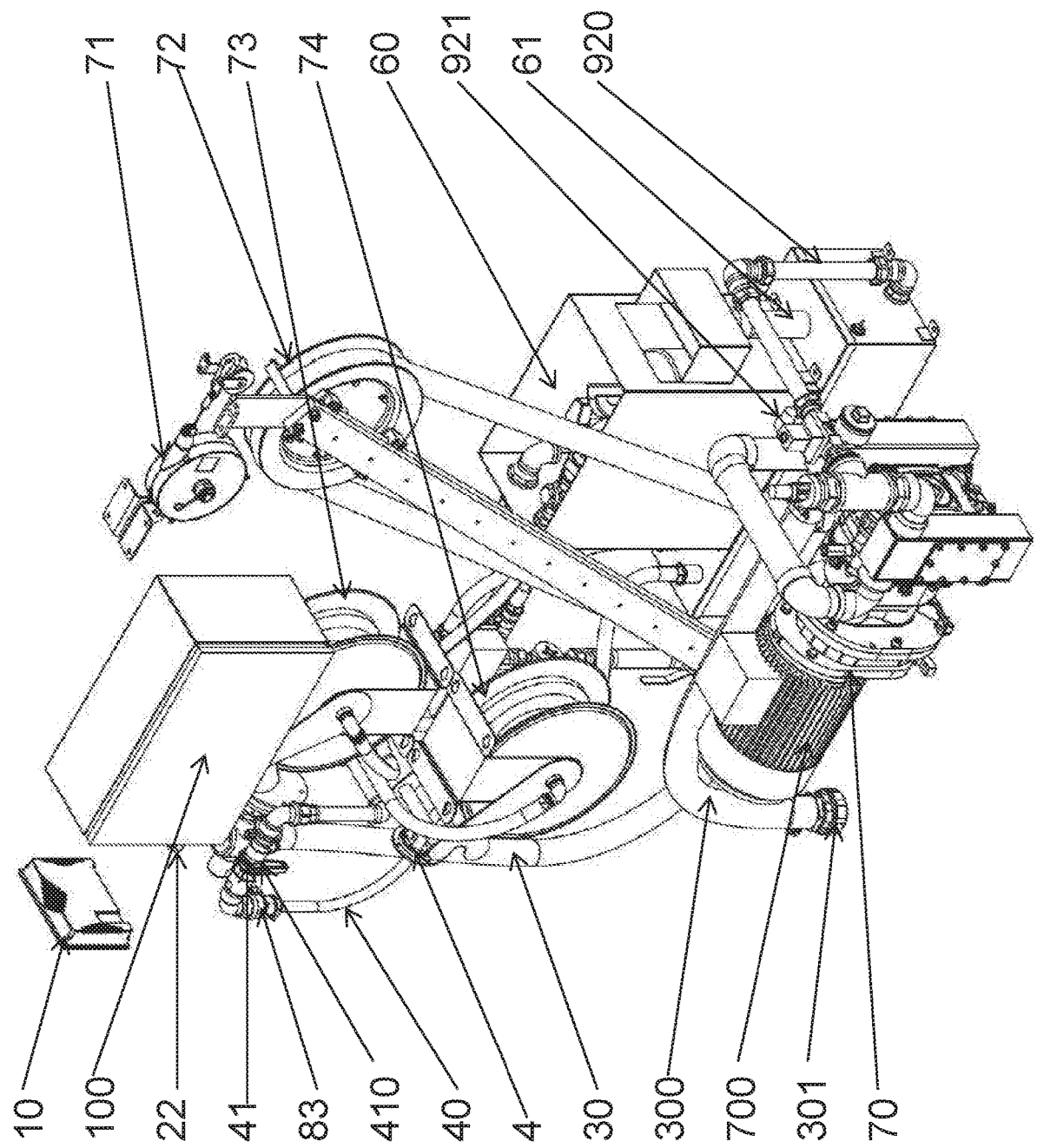
FIG. 10A is a perspective side view from the rear and right of the preferred embodiment of the waste disposal station according to the invention, with the housing masked.
Figure 10B:
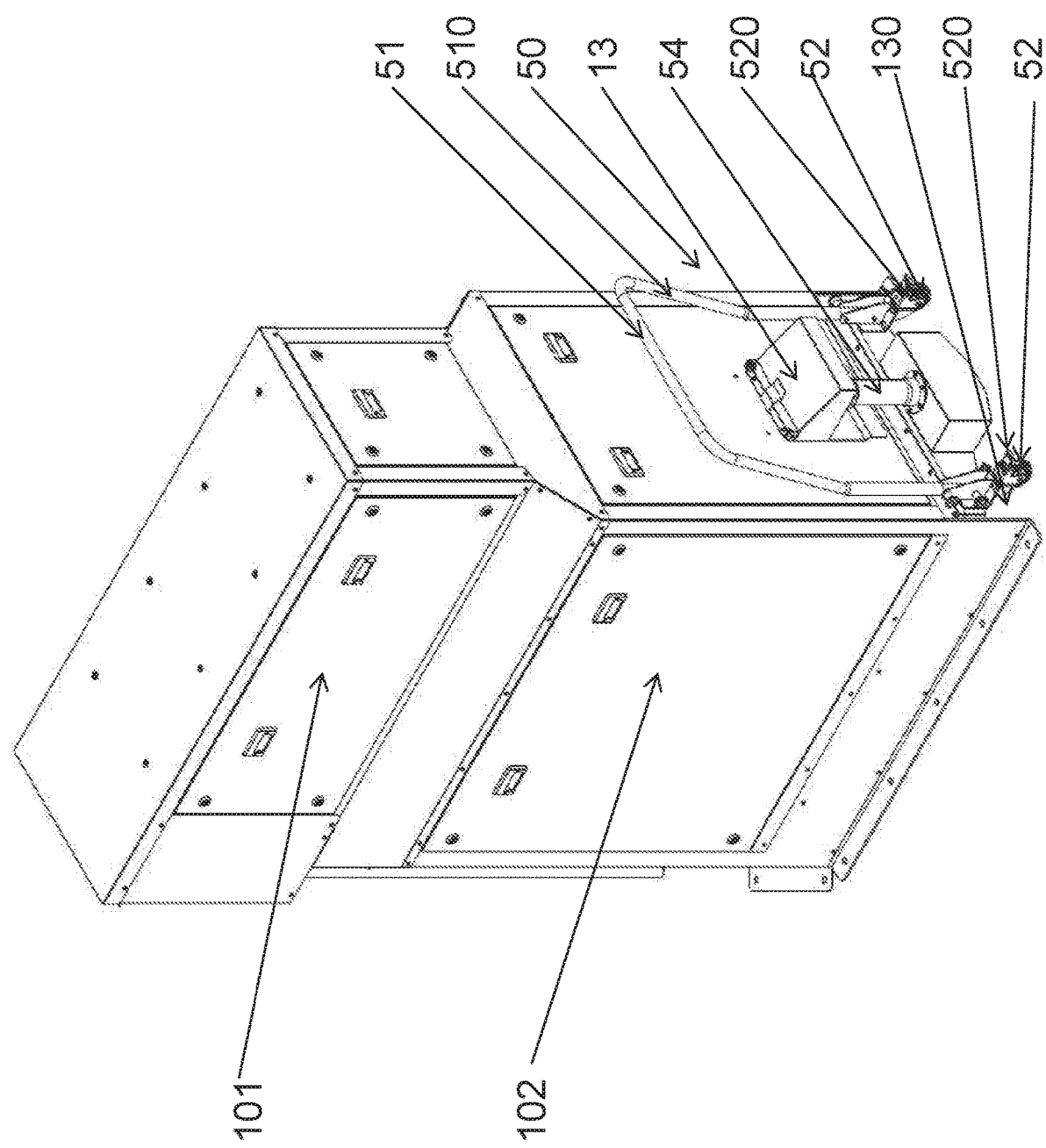
FIG. 10B is a perspective side view from the rear and right of the preferred embodiment of the waste disposal station according to the invention.
Figure 11B:
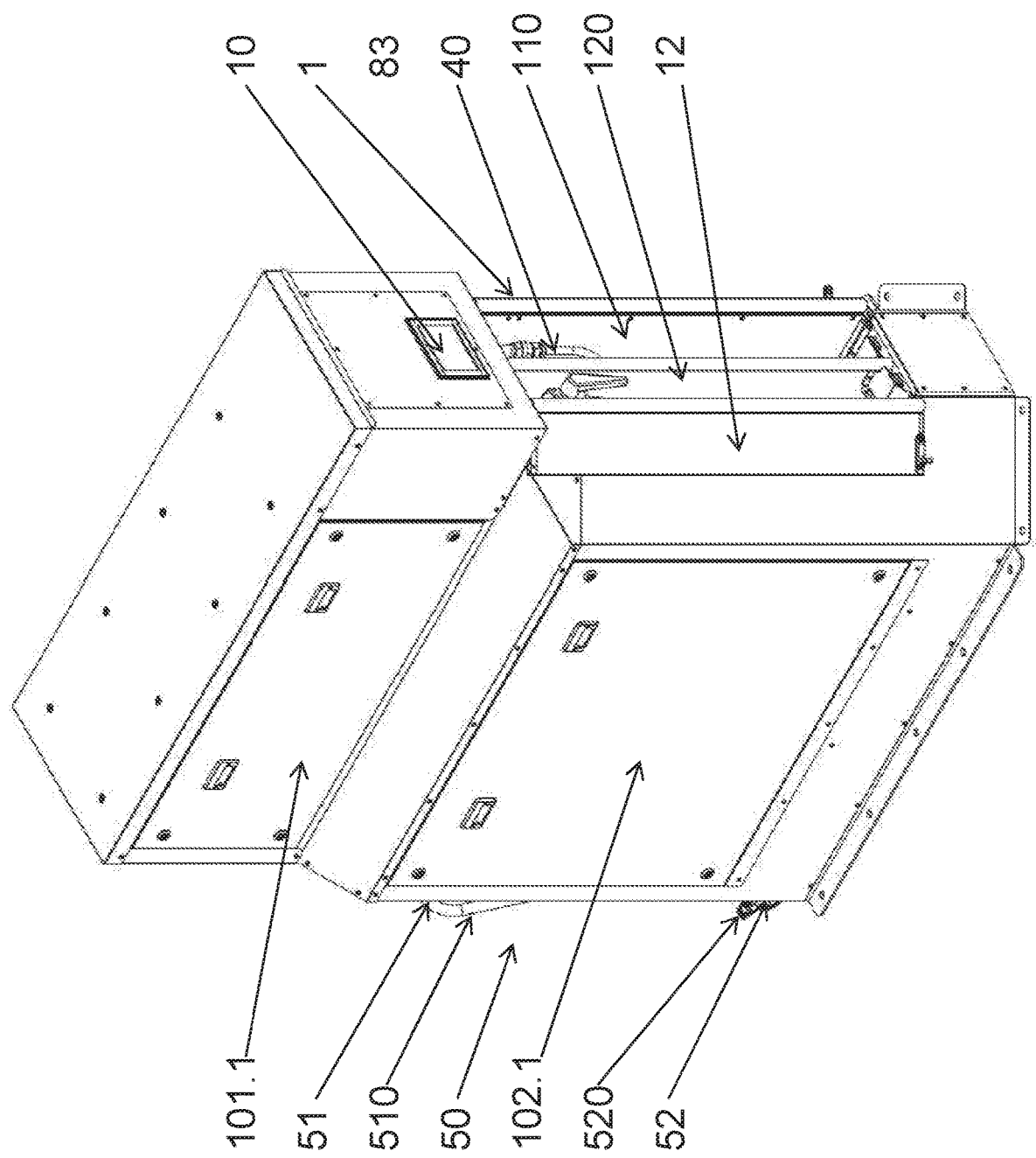
FIG. 11B is a perspective side view from front left of the preferred embodiment of the waste disposal station according to the invention.
Figure 12A:
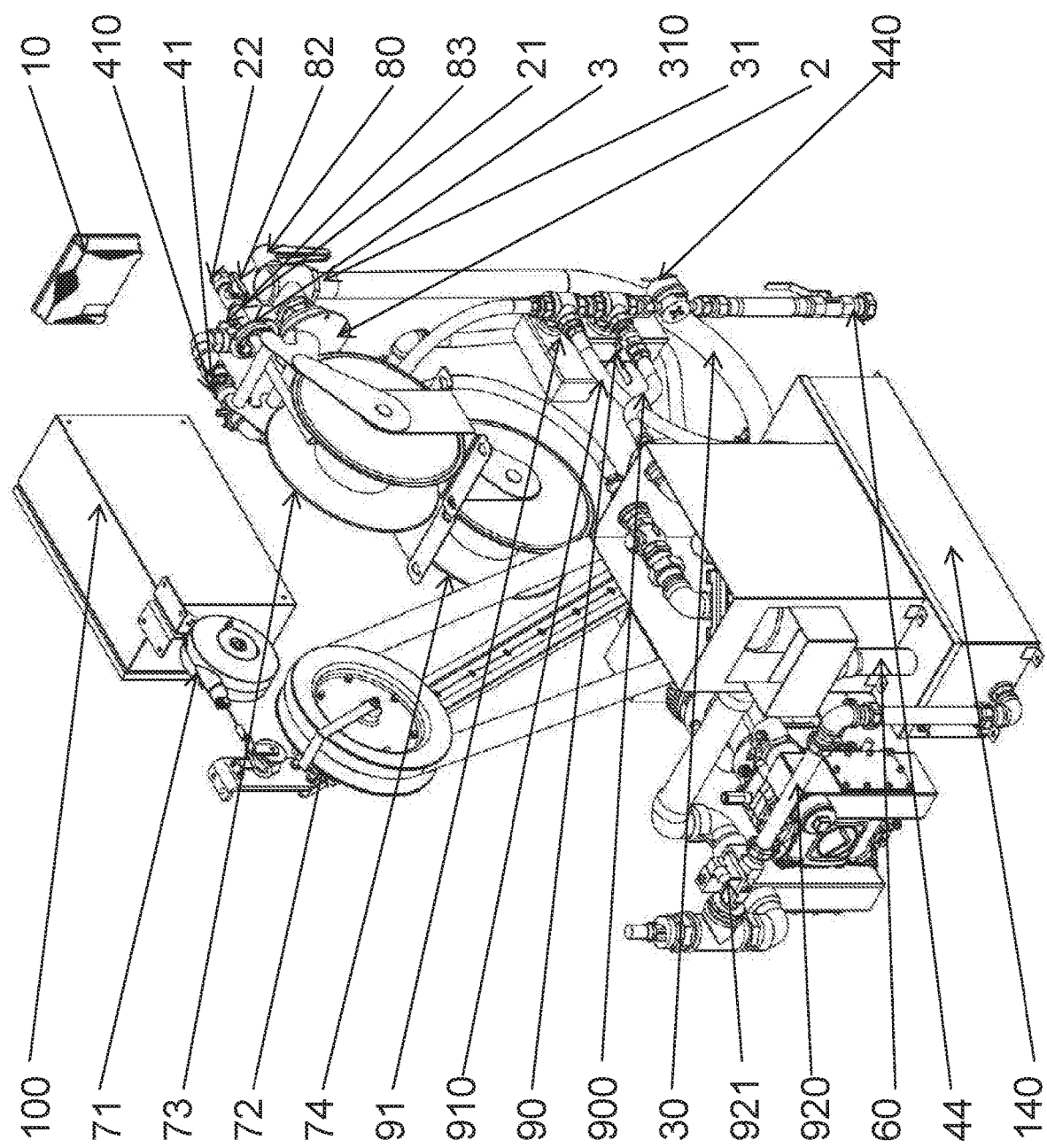
FIG. 12A is a perspective side view from the rear and left of the preferred embodiment of the waste disposal station according to the invention.
Figure 12B:
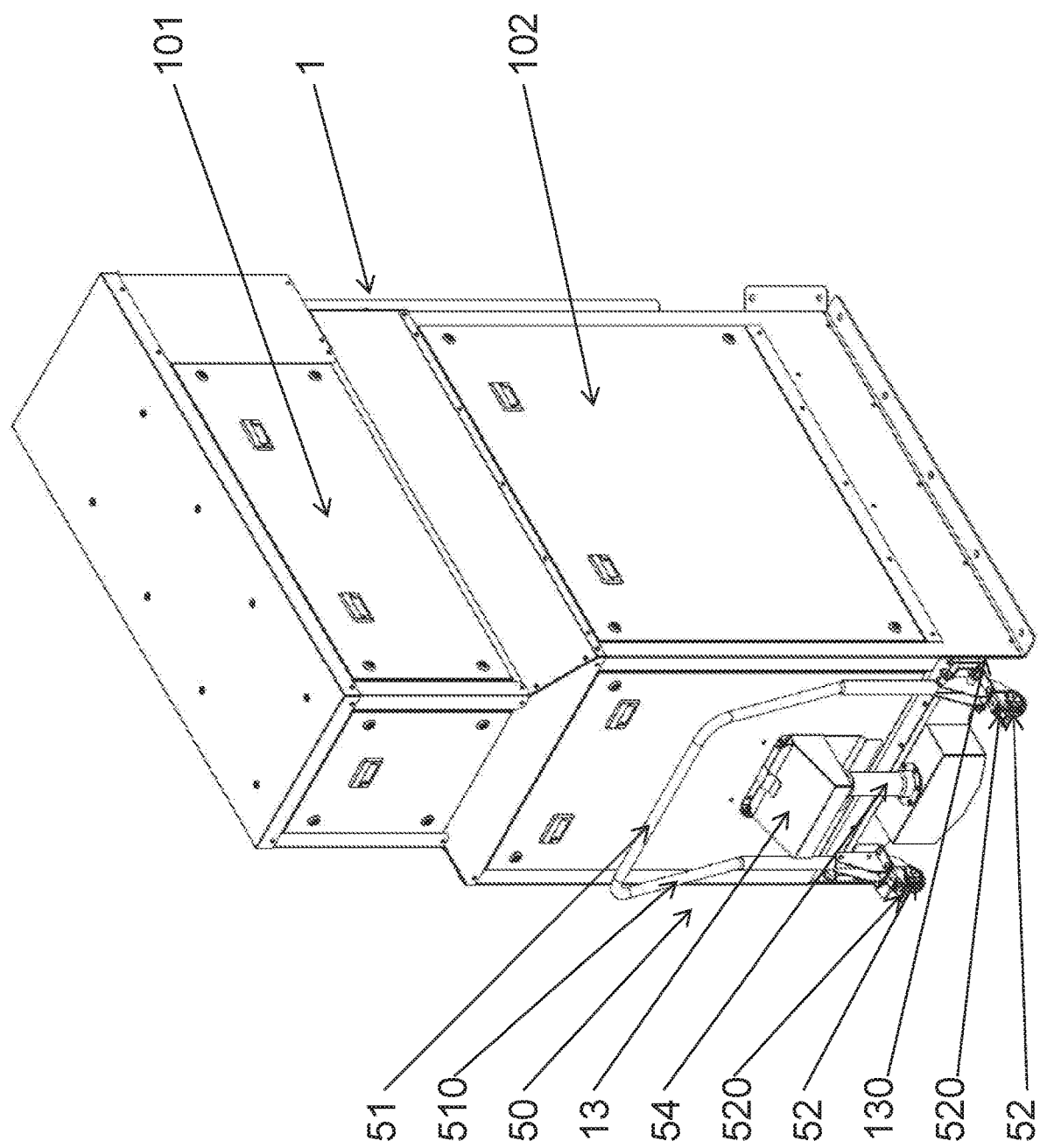
FIG. 12B is a perspective side view from the rear and left of the preferred embodiment of the waste disposal station according to the invention, with the housing masked.

FIGS. 8A and 8B show the preferred embodiment of the waste disposal station according to the invention in a side view from the left, without housing 1 and with housing 1, and without maintenance flaps 101.1, 102.1. In the absence of the third maintenance flap 101.1 and the fourth maintenance flap 102.1, easy access is ensured to the separate elements in an inner space of the waste disposal station. This allows maintenance, repair, and/or replacement of the elements. In the side view from the left in FIGS. 8A and 8B, there is also a collecting tank 140 arranged underneath a system separator 60.

According to the embodiment, the second receiving unit 410 of freshwater hose 40 is connected to a freshwater flushing hose 930, which is designed to flush freshwater hose 40. Freshwater flushing hose 930 is connected on the outlet side to a collecting tank 140 in order to remove the freshwater used for flushing.

A first shutoff device comprising a first valve 90, and a second shutoff device comprising a second valve 91 and disposed downstream from the first shutoff device with the first valve 90, are provided in freshwater supply line 44. The first shutoff device comprising the first valve 90 is connected on the outlet side to a first freshwater discharge line 900. The first freshwater discharge line 900, which is connected on the inlet side to the freshwater supply line 44 via the first shutoff device and the first valve 90, can be connected on the outlet side to system separator 60. The second shutoff device with the second valve 91 can be connected on the outlet side to a second freshwater discharge line 910. The second freshwater discharge line 910, which is connected on the inlet side to the freshwater supply line 44 via the second shutoff device and the second valve 91, can be connected on the outlet side to collecting tank 140. Freshwater supply line 44 describes the line which can be connected to the freshwater tank and/or to the drinking water network.

Tap water is preferably supplied via system separator 60. System separator 60 is connected on the inlet side to the first freshwater discharge line 900, thus preventing non-freshwater which is fed into system separator 60 from flowing back into the freshwater supply due to changes in pressure, and thus preventing germs from entering the freshwater network. System separator 60 is also connected to collecting tank 140 via a pipeline 61, in order to feed water which is not to be used into collecting tank 140.

Collecting tank 140 connected on the outlet side to feed pump 70 via a discharge line 920 having a further shutoff device 921, in order to dispose of the water that has collected in collecting tank 140 together with the wastewater discharged from the vehicle, or via the same wastewater discharge pipe 300, at least. Shutoff device 920, which is opened only when water must be removed from the collecting tank, prevents parts of the wastewater from entering the collecting tank.

FIGS. 9A-10B show perspective side views from the left of the preferred embodiment of the waste disposal station according to the invention. FIGS. 11A-12B show corresponding perspective side views from the right of the preferred embodiment of the waste disposal station according to the invention. The perspective views of the waste disposal station according to the invention in FIGS. 9A-12B show, from different perspectives, the elements already shown in FIGS. 5A-8B. The reference signs are used consistently throughout.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure and method without departing from the concepts of the present disclosure, and further it is to be understood that such concepts are intended to be covered by the following claims unless these claims by their language expressly state otherwise.

The invention claimed is:

1. A suction unit for wastewater tanks, comprising:
a suction channel extending from a suction adapter designed for attachment proximate an opening in a wastewater tank to a suction port;
a connection coupling extending from the suction adapter, wherein said connection coupling and said suction channel are arranged in such a way in relation to the adapter that when the adapter is installed proximate the opening in the wastewater tank, the suction channel extends into the wastewater tank and the connection coupling is arranged outside the wastewater tank;
a suction pump with a connecting line, which can be connected fluid-tightly to the connection coupling; and
a pump control unit which is in signal communication with the suction pump in order to control it;
wherein a flushing channel extends from a flush adapter designed for attachment proximate an opening in the wastewater tank to a flushing hole whereby flush water is delivered to the wastewater tank, the pump control unit being configured to control an extraction process such that wastewater is extracted from the wastewater tank through the suction channel, the connecting line and the suction pump by means of the suction pump, and the pump control unit being configured to control flushing process such that the flush water flows through the flushing channel when the wastewater tank is flushed using the flushing channel.

2. The suction unit pursuant to claim 1, wherein the pump control unit is configured to control an extraction process whereby:
the extraction process is performed in a first step;
the flushing process is carried out in a second step after or during the extraction process; and
wastewater is extracted from the wastewater tank through the suction channel, the connecting line and the suction pump by means of the suction pump in a third step after or during the second step.

3. The suction unit pursuant to claim 1, wherein the suction pump is designed as a section and the pump control unit is configured to control the suction pump whereby:
wastewater is extracted from the wastewater tank through the suction channel and the connecting line in a first step;
a conveying direction of the suction pump is reversed and wastewater is flushed from the wastewater tank through the flushing channel in a second step; and
the conveying direction of the suction pump is reversed yet again and wastewater is extracted from the wastewater tank through the suction channel and the connecting line in a third step.

4. The suction unit pursuant to claim 1, wherein the flushing channel has a peripheral rim proximate the suction port that surrounds an axial opening and has at least one axially extending peripheral recess, a plurality of radial openings, or a rotatable mounted nozzle designed to be rotated by the flush water flowing through the suction channel during the flushing process and which allows the flush water to flow out in a direction having radial directional components at a rotating angle about the longitudinal axis of the suction channel.

5. The suction unit pursuant to claim 1, wherein the suction channel is shaped proximate the suction port as a suction hood having an inner diameter that is greater than the diameter of the suction channel proximate the adapter.

6. The suction unit pursuant to claim 1, wherein the suction channel is made of rubbery elastic material proximate the suction port.

7. The suction unit pursuant to claim 1, wherein the suction channel and the flushing channel are designed as an integral suction and flushing channel, and that the suction adapter and the flush adapter are designed as an integral extraction and flush adapter from which the suction and flushing channel extends.

8. The suction unit pursuant to claim 1, wherein the suction pump is connected on a connector side opposite the connecting line to a wastewater line and to a flush water line via a valve mechanism.

9. The suction unit pursuant to claim 2, wherein the suction pump is connected on a connector side opposite the connecting line to a wastewater line and to a flush water line via a valve mechanism, and the valve mechanism is designed to connect the suction pump with the wastewater line during the first and third step and with the flush water line during the second step.

10. The suction unit pursuant to claim 9, wherein the valve mechanism is designed to block the entry of wastewater into the flush water line.

11. The suction unit pursuant to claim 8, wherein the valve mechanism includes a system separator which is connected to a drinking water line and that provides the drinking water drawn from the drinking water line as flush water and blocks the entry of flush water or wastewater into the drinking water line.

12. The suction unit pursuant to claim 2, wherein the suction pump is a rotary lobe pump which is controlled by the pump control unit so that it reverses its direction of rotation between the first and the second step and between the second and the third step.

13. The suction unit pursuant to claim 2, further comprising an aeration and air extraction unit which allows air to enter the wastewater tank during the extraction process and which allows air to escape from the wastewater tank during the flushing process, said aeration and air extraction unit preferably being formed in a flange connection.

14. A waste disposal station for a vehicle, comprising:
a suction channel extending from a suction adapter designed for attachment proximate an opening in a wastewater tank to a suction port;
a connection coupling extending from the suction adapter, wherein said connection coupling and said suction channel are arranged in such a way in relation to the adapter that when the adapter is installed proximate the opening in the wastewater tank, the suction channel extends into the wastewater tank and the connection coupling is arranged outside the wastewater tank;
a feed pump connected on an inlet side to a first end of a suction hose;
a suction pump with a connecting line, which can be connected fluid-tightly to the connection coupling; and
a pump control unit which is in signal communication with the suction pump in order to control it;
wherein a flushing channel extends from a flush adapter designed for attachment in the region of an opening in the wastewater tank to a flushing hole whereby flush water is delivered to the wastewater tank, the pump control unit being configured to control an extraction process such that wastewater is extracted from the wastewater tank through the suction channel, the connecting line and the suction pump by means of the suction pump, and the pump control unit being configured to control a flushing process such that the flush water flows through the flushing channel when the wastewater tank is flushed using the flushing channel.

15. The waste disposal station pursuant to claim 14, further comprising:
a positionable waste disposal unit which is movable relative to the feed pump, the positionable waste disposal unit comprising a collecting basin having an upper rim, a basin wall extending from the upper rim to a bottom floor of the collecting basin and a discharge unit, and a suction port connected by means of a discharge line to the discharge unit of the collecting basin;
wherein the suction port is arranged above the upper rim of the collecting basin in the direction of gravity; and
wherein a second end of the suction hose has a first coupling element that can be releasably coupled to a second coupling element formed at the suction port.

16. The waste disposal station pursuant to claim 15, wherein the discharge unit is designed as a suction coupling which is arranged in the collecting basin proximate a lower floor thereof, and wherein the discharge line includes the suction coupling.

17. The waste disposal station pursuant to claim 15, further comprising:
a housing, wherein the housing has an insulating layer and/or a heater.

18. The waste disposal station pursuant to claim 15, wherein the first coupling element of the suction hose second end can selectively be releasably coupled to the second coupling element arranged around the suction port, or to a third coupling element arranged around a suction coupling of a wastewater tank on the vehicle.

19. The waste disposal station pursuant to claim 14, wherein the feed pump is provided in the form of a rotary lobe pump.

20. The waste disposal station pursuant to claim 15, further comprising:
a first enclosure for receiving the waste disposal unit is provided in the waste disposal station; and
wherein, in a parked position, at least sections of the waste disposal unit are removably stored in the first enclosure.

21. The waste disposal station pursuant to claim 20, further comprising:
a first receiving unit for receiving the first coupling element in a storage position, in which the first coupling element is arranged above the feed pump in the direction of gravity and in which the first coupling element is arranged vertically above the collecting basin when the waste disposal unit is in the parked position.

22. The waste disposal station pursuant to claim 20, wherein, in the parked position, the waste disposal unit is secured inside the first enclosure by means of a first locking bolt which can be electrically or mechanically released.

23. The waste disposal station pursuant to claim 14, wherein the waste disposal station is designed as a supply station comprising a tap water hose which can be pulled out from a storage position into a supply position or a freshwater hose which can be pulled out from a storage position into a supply position.

24. The waste disposal station pursuant to claim 23, wherein a second enclosure adapted to receive the suction hose and the tap water hose or freshwater hose is provided in the waste disposal station; and
wherein a substantial portion of the suction hose is stored inside a first receiving opening and can be pulled out from the first receiving opening and a substantial portion of the tap water hose is stored inside a second receiving opening and can be pulled out from the second receiving opening.

25. The waste disposal station pursuant to claim 23, further comprising a third enclosure for receiving the freshwater hose only provided in the waste disposal station, and wherein a substantial portion of the freshwater hose is stored inside a third receiving opening and can be pulled out from the third receiving opening.

26. The waste disposal station pursuant to claim 23, wherein the tap water hose has a fourth coupling element or the freshwater hose has a fifth coupling element.

27. The waste disposal station pursuant to claim 26, wherein a first coupling element of the suction hose, the fourth coupling element of the tap water hose, and the fifth coupling element of the freshwater hose are differently designed.

28. The waste disposal station pursuant to claim 24, further comprising a plurality of coilers for storing the tap water hose or the freshwater hose in a non-operational position and for retracting the tap water hose or the freshwater hose to the non-operational position.

29. The waste disposal station pursuant to claim 24, wherein a first enclosure is covered with a third flap, a second enclosure is covered with a first flap, and a third enclosure is covered with a second flap.

30. The waste disposal station pursuant to claim 20, wherein in the parked position, the suction port is covered with a third flap which can be moved from a closed position, in which the suction port is covered, into an open position, wherein at least sections of the waste disposal unit are received in the first enclosure both in the closed position and in the open position.

31. The waste disposal station pursuant to claim 29, wherein the first flap, the second flap, or the third flap are locked by locking bolts which can be actuated electrically or mechanically, and wherein the first flap and the second flap may be reciprocally locked.

32. The waste disposal station pursuant to claim 14, further comprising a control unit in signal communication with a user interface and which is configured to start and/or to stop an extraction process and start and/or to stop a supply of tap water or a supply of freshwater.

33. The waste disposal station pursuant to claim 31, wherein the locking bolts of the first flap, the second flap, or the third flap may be actuated electrically and the control unit is in signal communication with the locking bolt of the first flap, the second flap, or the third flap and is configured to release electrically the locking bolt of the first flap, the second flap, or the third flap.

34. The waste disposal station pursuant to claim 32, further comprising a vehicle identification unit for detecting a vehicle identification code, wherein the vehicle identification unit is in signal communication with the control unit and with an electronic data store and is configured to determine a positioning parameter from the vehicle identification code for any vehicle identification code identified by means of the vehicle identification unit.

35. The waste disposal station pursuant to claim 33, further comprising a distance measuring unit, wherein the control unit is configured to assign, in a configuration mode, a distance measured by means of the distance measuring unit to a vehicle identification code detected by means of a vehicle identification unit, and to store in a data store said distance and its assignment to said vehicle identification code.

36. The waste disposal station pursuant to claim 14, wherein the waste disposal station can be mounted on a mounting frame concreted into a tire contact area and is designed to be connected to a supply line for freshwater or tap water and to a wastewater disposal line inside the mounting frame.

37. The waste disposal station pursuant to claim 14, wherein the suction hose is guided around a reverse roller which is rotatably mounted on an axle, wherein the axle is mounted translationally movably along a guideway and can be moved from a retracted position of the suction hose along the guideway into a pulled-out position of the suction hose.

38. The waste disposal station pursuant to claim 37, wherein the guideway extends with a vertical directional component and the reverse roller is arranged in the retracted position of the suction hose above a position of the reverse roller in the pulled-out position of the suction hose.

39. The waste disposal station pursuant to claim 14, further comprising at least one camera for recording an area above the collecting basin and a display device configured to display what is recorded by the camera to a user.

40. The waste disposal station pursuant to claim 14, further comprising a diagnostic interface via which data relating to an extraction process and/or a filling process can be retrieved, and
wherein the waste disposal station can be coupled in signal communication with a vehicle diagnosis system.

41. A vehicle diagnosis system for use with a waste disposal station according to claim 14, comprising a diagnostic interface on a vehicle side which has an interface plug such as an OBD plug or an SAE plug or an RJ plug, an interface module, and an air interface via which vehicle data or data from control units and any sensors, actuators or the like which are contained in the vehicle can be retrieved, wherein a diagnostic data can be transferred via the air interface to a user interface and further characterized in that the diagnostic data can be supplemented with data which do not include any diagnostic data and which are collected outside a vehicle diagnosis system from an add-on module, a communication network, or a central database.

42. The vehicle diagnosis system pursuant to claim 41, wherein the data include one or more additional items of information, including the date and time of day, a position, information about an extraction process, or information about a filling process in respect of freshwater tank.

43. The vehicle diagnosis system pursuant to claim 42, wherein the user interface includes a programmable analyzer, and
wherein the analyzer includes reference values and is configured to assign additional information to the collected diagnostic data and to compare these with the reference values to detect or to signal any abnormality or any difference from reference values, including any falling short of a programmed limit value.

44. The vehicle diagnosis system pursuant to claim 43, wherein the interface module is integrated in the interface plug or is connected to the interface plug, and further comprising a storage unit which is adapted to store diagnostic data, and logic circuitry which is adapted to carry out an analysis protocol of the analyzer.

45. The vehicle diagnosis system pursuant to claim 44, wherein the vehicle diagnosis system is designed to detect any abnormality in respect of freshwater needs, the latter process comprising the following steps:
- transferring the diagnostic data in respect of a freshwater tank volume via the air interface to the user interface;
- supplementing the diagnostic data with data;
- storing the diagnostic data relating to the volume of the freshwater tank in the storage unit; and
- conducting the analysis protocol of the analyzer, wherein the analysis protocol is designed to calculate a water consumption from the diagnostic data, to compare the calculated water consumption with the reference value for average water consumption which is included in the analyzer, and to calculate a remaining volume from the difference between the filling capacity from the filling process and the water consumption.

46. The vehicle diagnosis system pursuant to claim 45, wherein the diagnostic data is supplemented with a date and time of day, a position, and information concerning the most recent filling of the freshwater tank, including a filling capacity and a position in the filling process.

* * * * *